US009265017B2

United States Patent
Sorrentino

(10) Patent No.: US 9,265,017 B2
(45) Date of Patent: Feb. 16, 2016

(54) REFERENCE SIGNALS IN WIRELESS COMMUNICATION

(71) Applicant: Telefonaktiebolaget LM Ericsson (publ), Stockholm (SE)

(72) Inventor: Stefano Sorrentino, Solna (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 456 days.

(21) Appl. No.: 13/806,397

(22) PCT Filed: Nov. 13, 2012

(86) PCT No.: PCT/SE2012/051247
§ 371 (c)(1),
(2) Date: Dec. 21, 2012

(87) PCT Pub. No.: WO2013/119161
PCT Pub. Date: Aug. 15, 2013

(65) Prior Publication Data
US 2014/0112260 A1 Apr. 24, 2014

Related U.S. Application Data

(60) Provisional application No. 61/595,842, filed on Feb. 7, 2012.

(51) Int. Cl.
*H04W 52/54* (2009.01)
*H04W 52/32* (2009.01)
(Continued)

(52) U.S. Cl.
CPC ............ *H04W 52/54* (2013.01); *H04W 52/325* (2013.01); *H04W 72/0413* (2013.01); *H04W 52/146* (2013.01); *H04W 52/244* (2013.01)

(58) Field of Classification Search
CPC ... H04W 52/42; H04W 52/08; H04W 52/146; H04W 52/241; H04W 72/04; H04B 17/102

USPC .......... 370/328, 329, 252, 311, 318; 455/522, 455/69, 63.1, 67.11
See application file for complete search history.

(56) References Cited

U.S. PATENT DOCUMENTS 8,706,150 B2 * 4/2014 Park et al. .................... 455/522
2010/0048212 A1 2/2010 Yavuz et al.
2013/0083729 A1 * 4/2013 Xu et al. ...................... 370/328

FOREIGN PATENT DOCUMENTS

EP 1587221 * 3/2005
EP 1587221 A2 10/2005
(Continued)

OTHER PUBLICATIONS

LG Electronics, "SRS Enhancements for CoMP in Rel-11," 3GPP TSG RAN WG1 Meeting #68, R1-120443, Dresden, Germany, Feb. 10, 2012, pp. 1-3.
(Continued)

*Primary Examiner* — Jamal Javaid
(74) *Attorney, Agent, or Firm* — Patents on Demand, P.A.; Brian K. Buchheit; Scott M. Garrett

(57) ABSTRACT

A method in a wireless device (900) of transmitting uplink reference signals from the wireless device (900) in a wireless communication network (100) to enable network-centric measurements comprises obtaining power control information defining a time-dependent power control setting for said uplink reference signals. The method also comprises determining transmit power values for the uplink reference signals according to the time-dependent power control setting, to provide uplink reference signals of different transmit power values at different time instants. The method further comprises transmitting the uplink reference signals with the determined transmit power values according to the time-dependent power control setting.

36 Claims, 13 Drawing Sheets

(51) Int. Cl.
*H04W 72/04* (2009.01)
*H04W 52/14* (2009.01)
*H04W 52/24* (2009.01)

(56) References Cited

FOREIGN PATENT DOCUMENTS

| EP | 2523510 | A1 | 11/2012 |
| WO | 2011083706 | A1 | 7/2011 |

OTHER PUBLICATIONS

3rd Generation Partnership Project. "3GPP TS 25.214 V11.0.0 (Dec. 2011)," 3rd Generation Partnership Project; Technical Specification Group Radio Access Network; Physical layer procedures (FDD) (Release 11). Dec. 19, 2011. pp. 1-106.

\* cited by examiner

REFERENCE SIGNALS IN WIRELESS COMMUNICATION

TECHNICAL FIELD

The present embodiments generally relate to wireless communications and, more particularly, to a method and device for transmitting uplink reference signals from a wireless device in a wireless communication network, as well as a method and network node for supporting uplink reference signal configuration of a wireless device in a wireless communication network.

BACKGROUND

There is a wide variety of different wireless communication networks. A few examples of modern networks include Global System for Mobile Communications (GSM), Wideband Code Division Multiple Access/High Speed Packet Access (WCDMA/HSPA), and Long Term Evolution (LTE), etc. The 3rd-Generation Partnership Project (3GPP) is continuing development of the LTE network technologies. Improved support for heterogeneous network operations is part of the ongoing specification of 3GPP LTE Release 11 (Rel-11), and further improvements are being discussed in the context of new features for Rel-11. In heterogeneous networks, a mixture of cells of different sizes and overlapping coverage areas are deployed.

One example of such a deployment is seen in a system where several pico-cells, each comprising a base station or low-power transmitting/receiving node with a respective coverage area, are deployed within the larger coverage area of a macro-cell, which comprises a base station or high-power transmitting/receiving node. As will be discussed in further detail below, the large difference in output transmit power, e.g., 46 dBm in macro-cells and 30 dBm or less in pico-cells, results in different interference scenarios from those that are seen in networks where all base stations have the same output transmit power.

Throughout this document, nodes or points in a network are often referred to as being of a certain type, e.g., a "macro-" node, or a "pico-" point. However, unless explicitly stated otherwise, this should not be interpreted as an absolute quantification of the role of the node or point in the network but rather as a convenient way of discussing the roles of different nodes or points relative to one another. Thus, a discussion about macro- and pico-cells could just as well be applicable to the interaction between micro-cells and femto-cells, for example.

One aim of deploying low-power nodes such as pico base stations within the macro coverage area is to improve system capacity, by means of cell-splitting gains. In addition to improving overall system capacity, this approach also allows users to be provided with a wide-area experience of very-high-speed data access, throughout the network. Heterogeneous deployments are in particular effective to cover traffic hotspots, i.e., small geographical areas with high user densities. These areas can be served by pico-cells, for example, as an alternative deployment to a denser macro network.

The most basic means to operate heterogeneous networks is to apply frequency separation between the different, so-called layers. For instance, the macro-cell and pico-cells can be configured to operate on different, non-overlapping carrier frequencies, thus avoiding any interference between the carrier frequencies, e.g. layers. With no macro-cell interference towards the under-laid cells, i.e., the cells having coverage areas falling substantially or entirely within the coverage area of the macro-cell, cell-splitting gains are achieved when all resources can simultaneously be used by the under-laid cells.

One drawback of operating layers on different carrier frequencies is that it may lead to inefficiencies in resource utilization and energy consumption. For example, if there is a low level of activity in the pico-cells, it could be more efficient to use all carrier frequencies in the macro-cell, and then basically switch off the pico-cells. However, the split of carrier frequencies across layers in this basic configuration is typically done in a static manner.

Another approach to operating a heterogeneous network is to share radio resources between layers (interpreted as carrier frequencies). Thus, two or more layers can use the same carrier frequencies, by coordinating data and/or control transmissions across macro- and pico-cells. This type of coordination is referred to as inter-cell interference coordination (ICIC). With this approach, certain radio resources are allocated to the macro-cells for a given time period, whereas the remaining resources can be accessed by the under-laid cells without interference from the macro-cell. Depending on the traffic situations across the layers, this resource split can change over time to accommodate different traffic demands. In contrast to the earlier described static allocation of carrier frequencies, this way of sharing radio resources across layers can be made more or less dynamic depending on the implementation of the interface between the nodes. In LTE, for example, an X2 interface has been specified in order to exchange different types of information between base station nodes, for coordination of resources. One example of such information exchange is that a base station can inform other base stations that it will reduce transmit power on certain resources.

Time synchronization between base station nodes is generally required to ensure that ICIC across layers will work efficiently in heterogeneous networks. This is of particular importance for time-domain-based ICIC schemes, where resources are shared in time on the same carrier.

Before an LTE terminal can communicate with an LTE network it first has to find and acquire synchronization to a cell within the network, a process known as cell search. Next, the user equipment (UE) has to receive and decode system information needed to communicate with and operate properly within the cell. Finally, the UE can access the cell by means of the so-called random-access procedure.

In order to support mobility, a terminal needs to continuously search for, synchronize to, and estimate the reception quality of both its serving cell and neighbor cells. The reception quality of the neighbor cells, in relation to the reception quality of the current cell, is then evaluated in order to determine whether a handover, for terminals in connected mode, or cell re-selection, for terminals in idle mode, should be carried out. For terminals in connected mode, the handover decision is taken by the network, based on measurement reports provided by the terminals. Examples of such reports are reference signal received power (RSRP) and reference signal received quality (RSRQ). Alternatively, a network-centric approach may be used, wherein the network performs measurements such as RSRP and RSRQ on uplink signals transmitted by the UE.

The results of these measurements, which are possibly complemented by a configurable offset, can be used in several ways. The UE can, for example, be connected to the cell with the strongest received power. Alternatively, the UE can be assigned to the cell with the best (i.e. largest) path gain. An approach somewhere between these alternatives may be used.

These selection strategies do not always result in the same selected cell for any given set of circumstances, since the base station output powers of cells of different type are different. This is sometimes referred to as link imbalance. For example, the output power of a pico base station or a relay node is often on the order of 30 dBm (1 watt) or less, while a macro base station can have an output power of 46 dBm (40 watts). Consequently, even in the proximity of the pico-cell, the downlink signal strength from the macro-cell can be larger than that of the pico-cell. From a downlink perspective, it is often better to select a cell based on downlink received power, whereas from an uplink perspective, it would be better to select a cell based on the path loss.

From a system perspective, it might often be better, in the above scenario, for a given UE to connect to the pico-cell even under some circumstances where the downlink from macro-cell is significantly stronger than the pico-cell downlink. However, ICIC across layers will be needed when the terminal operates within the region between the uplink and downlink borders, i.e., the link imbalance zone.

The concept of a "point" is heavily used in conjunction with techniques for coordinated multipoint (CoMP). In this context, a point corresponds to a set of antennas covering essentially the same geographical area in a similar manner. One transmitting/receiving node, such as an LTE base station, might control one or several points. Thus, a point might correspond to one of the sectors at a base station site, but it may also correspond to a site having one or more antennas all intending to cover a similar geographical area. Often, different points represent different sites. Antennas correspond to different points when they are sufficiently geographically separated and/or have antenna diagrams pointing in sufficiently different directions. Techniques for CoMP entail introducing dependencies in the scheduling or transmission/reception among different points, in contrast to conventional cellular systems where a point is operated more or less independently from the other points, from a scheduling point of view.

When downlink (DL) CoMP is applied, the network needs to dynamically or semi-statically determine which transmission points are to serve each UE in the DL. Additionally, the network needs to determine a set of points for which receiving feedback from the UE would be beneficial. Such a set of points for feedback reception is typically selected in a semi-static fashion (i.e., they are typically constant for several subframes) and the corresponding feedback may be employed for scheduling, link adaptation and dynamic selection of the transmission points within the set of points for which feedback is available. The set of suitable transmission points for a UE typically changes dynamically, e.g. as the UE moves through the network. The network therefore needs to select, and continuously update, a set of candidate transmission points for the UE. The UE then sends more detailed feedback, e.g. pre-coding information, for the points in the candidate set, thereby enabling the network to select the best downlink transmission points. The techniques mentioned above will be collectively referred to as "point selection" in the following.

The points in the candidate set may be determined in a UE-centric manner, wherein the UE performs measurements on downlink signals (e.g. reference signals provided for generating channel state information (CSI-RS), see also the appendix for a more extensive description) and reports the results to the network. Alternatively, a network-centric approach may be used for point selection, wherein the network performs measurements, e.g. pathloss, on uplink signals transmitted by the UE. For example, sounding reference signals (SRS) may be used for this purpose. A description of SRS and other reference signals (RS) can be found in the appendix.

Uplink (UL) power control (PC) for SRS is currently based on UL PC for physical uplink shared channel (PUSCH), with the exception of a power offset parameter (see also the appendix for a more extensive description). Typically, SRS are power controlled in order to reach the DL transmission point(s) in a Time Division Duplex (TDD) network, in case channel reciprocity is exploited, and the UL reception point for link adaptation, in case of both Frequency Division Duplex (FDD) and TDD.

On the other hand, in order to enable network-centric CoMP points selection and/or mobility measurements, SRS need to be received with sufficient quality at all points that are potentially involved in the CoMP operation. Such a set is likely larger than the set of points exploited for actual DL and/or UL CoMP operations. Such a mismatch may result in difficulty, or even impossibility, of estimating pathloss for certain UEs that are poorly received at nodes potentially suitable for DL CoMP transmission.

One possible solution would be to increase SRS power. However, this would result in increased interference as well as increased energy consumption for the UEs.

Another possible solution would consist of increasing the size of Downlink Control Information (DCI) formats to include independent closed loop (CL) PC bits for SRS and PUSCH or physical uplink control channel (PUCCH). However, such a solution has the undesirable drawback of increasing the signaling overhead, resulting in problems in terms of backwards compatibility as well as in reduced coverage and capacity for control channels.

Thus, it would be desirable to provide improvements related to uplink reference signals and network-centric measurements in a wireless communication network, for example estimation of received UE energy, such as pathloss estimation, or estimation of RSRP and/or RSRQ which can then be used for channel estimation. Such a mechanism would be beneficial e.g. for downlink transmission point selection and/or mobility and DL/UL link adaptation purposes. It would be particularly advantageous to be able to increase the estimation reliability and/or accuracy, while at the same time limiting the increase in interference and UE power consumption.

SUMMARY

It is an object to provide a method and a device for transmitting uplink reference signals from a wireless device in a wireless communication network.

It is also an object to provide a method and a device for supporting uplink reference signal configuration of a wireless device in a wireless communication network.

It is another object to provide a corresponding computer program.

These and other objects are met by the invention as defined by the accompanying patent claims.

An aspect relates to a method in a wireless device of transmitting uplink reference signals from the wireless device in a wireless communication network to enable network-centric measurements. The method comprises the step of obtaining power control information defining a time-dependent power control setting for the uplink reference signals. The method further comprises the step of determining transmit power values for the uplink reference signals according to the time-dependent power control setting, to provide uplink reference signals of different transmit power values at different time instants. The method also comprises the step of transmitting the uplink reference signals with the determined transmit power values according to the time-dependent power control setting.

Another aspect relates to a method in a network node for supporting uplink reference signal configuration of a wireless device in a wireless communication network to enable network-centric measurements. The method comprises the step of providing power control information defining a time-dependent power control setting for uplink reference signals. The method further comprises the step of transmitting that power control information defining a time-dependent power control setting to the wireless device to enable configuration of uplink reference signals with different transmit power values at different time instants, according to the time-dependent power control setting.

A further aspect relates to a wireless device configured to transmit uplink reference signals in a wireless communication network to enable network-centric measurements. The wireless device comprises processing circuitry configured to obtain power control information defining a time-dependent power control setting for the uplink reference signals. The wireless device also comprises processing circuitry configured to determine transmit power values for the uplink reference signals according to the time-dependent power control setting, to provide uplink reference signals of different transmit power values at different time instants. The wireless device further comprises radio circuitry configured to transmit the uplink reference signals with the determined transmit power values according to the time-dependent power control setting.

Yet another aspect relates to a network node configured to support uplink reference signal configuration of a wireless device in a wireless communication network to enable network-centric measurements. The network node comprises processing circuitry configured to provide power control information defining a time-dependent power control setting for uplink reference signals, and radio circuitry configured to transmit that power control information defining a time-dependent power control setting to the wireless device to enable configuration of uplink reference signals with different transmit power values at different time instants, according to the time-dependent power control setting.

Yet another aspect relates to a computer program for preparing, when executed by a computer, uplink reference signals from a wireless device in a wireless communication network to enable network-centric measurements. The computer program comprises program means configured to obtain power control information defining a time-dependent power control setting for the uplink reference signals. The computer program also comprises program means configured to determine transmit power values for the uplink reference signals according to the time-dependent power control setting, to provide uplink reference signals of different transmit power values at different time instants. The computer program further comprises program means configured to prepare the uplink reference signals for transmission with the determined transmit power values according to the time-dependent power control setting.

An advantage of the disclosed embodiments is that the proposed technology enables improved network-centric measurements in wireless communication networks. This technology may be used e.g. for mobility and/or CoMP points selection, DL/UL link adaptation applications or other applications, without significantly increasing energy consumption and interference.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

The present embodiments generally relate to network-centric measurements in a wireless communication network and, more particularly, to methods and devices for transmitting uplink reference signals from a wireless device in such a network.

Throughout the drawings, the same reference numbers are used for similar or corresponding elements.

The interested reader may find a more extensive description or various applications in wireless communication networks in the attached appendix.

As described in the background section, it is desirable to provide improvements related to uplink reference signals and network-centric measurements in a wireless communication network. The embodiments described herein propose a method and a device for transmitting uplink reference signals from a wireless device in a wireless communication network, as well as a method and a device for supporting uplink reference signal configurations of a wireless device in a wireless communication network, in order to enable such network-centric measurements.

Figure 1:
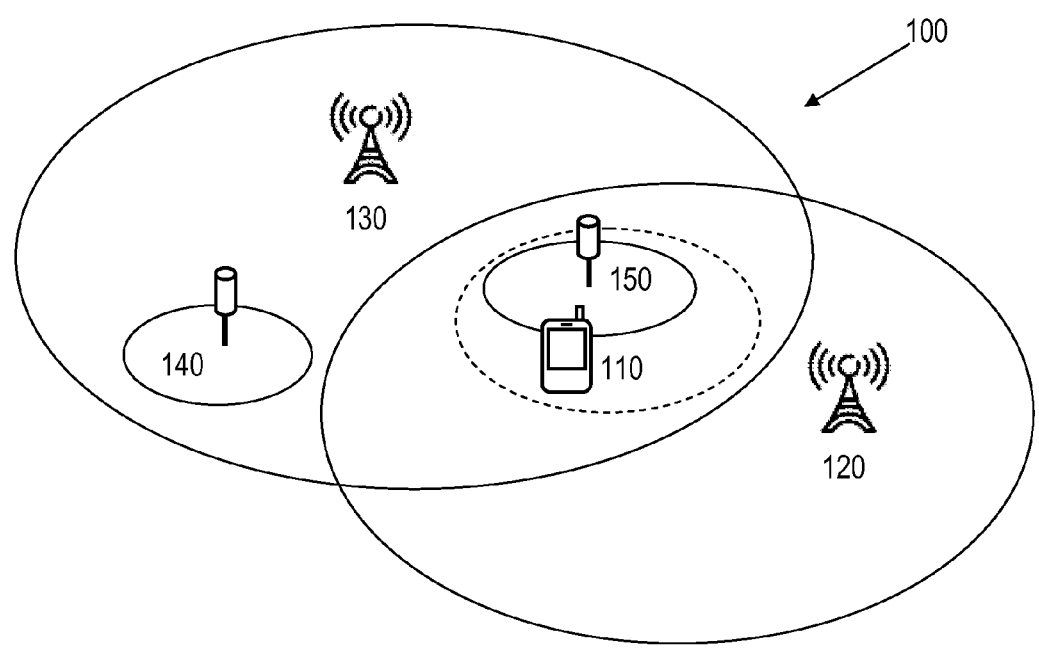
FIG. 1 is a schematic diagram illustrating an example of a wireless communication network.

FIG. 1 is a schematic diagram illustrating an example of a wireless communication network where UE 110 is connected to a wireless access point 150, for example a pico-node, in the uplink. However, all the wireless access points 120, 130, 140, 150 are potential candidate CoMP downlink transmission points.

The example network may further include any additional elements suitable to support communication between wireless devices or between a wireless device and another communication device (such as a landline telephone). Although the illustrated wireless device may represent a communication device that includes any suitable combination of hardware and/or software, this wireless device may, in particular embodiments, represent a device such as the example wireless device 900 illustrated in greater detail by FIG. 2. Similarly, although the illustrated network nodes may represent network nodes that includes any suitable combination of hardware and/or software, these network nodes may, in particular embodiments, represent devices such as the example network node 800 illustrated in greater detail by FIG. 3.

Figure 2:
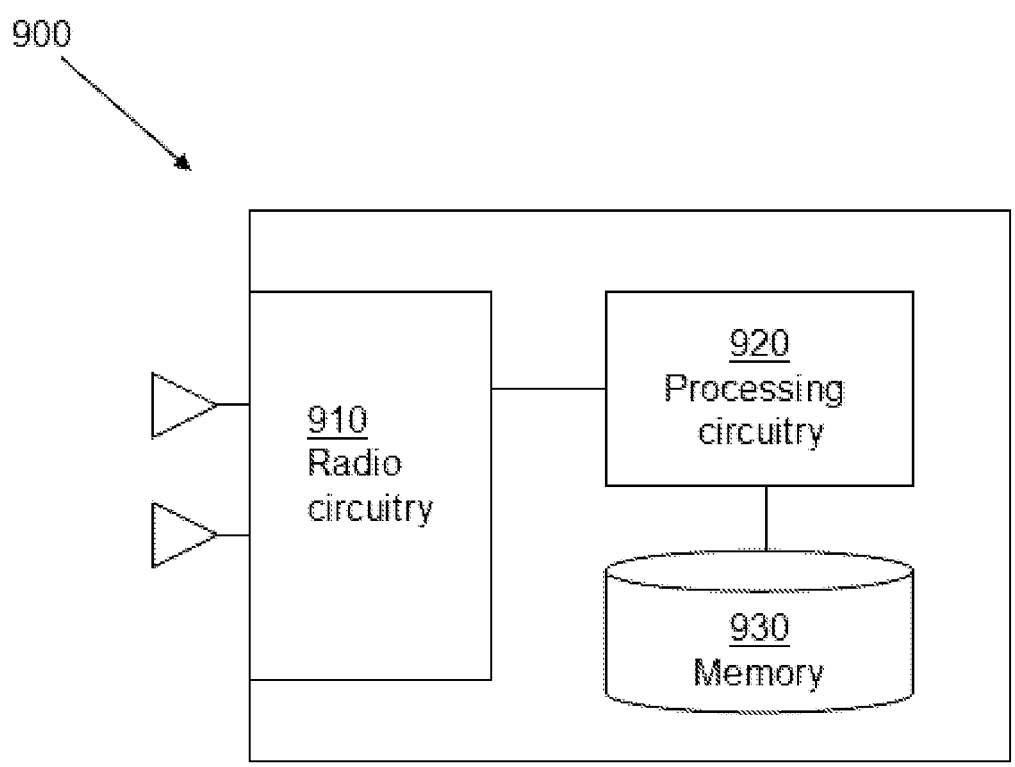
FIG. 2 is a block diagram of an example of a wireless device according to an embodiment.

As shown in FIG. 2, the example wireless device 900 includes radio circuitry 910, processing circuitry 920, a memory 930, and at least one antenna. The radio circuitry 910 may comprise RF circuitry and baseband processing circuitry (not shown). In particular embodiments, some or all of the functionality described below as being provided by mobile communication devices or other forms of wireless device may be provided by the processing circuitry 920 executing instructions stored on a computer-readable medium, such as the memory 930 shown in FIG. 2. Alternative embodiments of the wireless device 900 may include additional components beyond those shown in FIG. 2 that may be responsible for providing certain aspects of the wireless device's functionality, including any of the functionality described below and/or any functionality necessary to support the solution described below.

Figure 3:
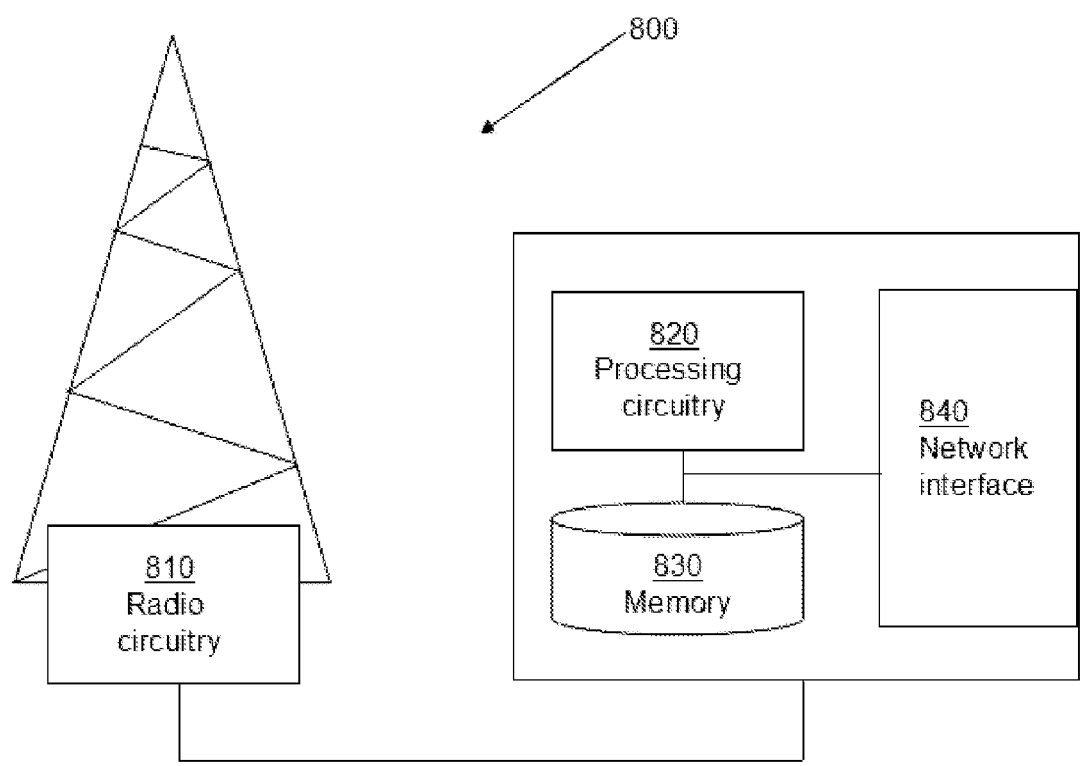
FIG. 3 is a block diagram of an example of a wireless network node according to an embodiment.

As shown in FIG. 3, the example network node 800 includes radio circuitry 810, processing circuitry 820, a memory 830, and at least one antenna. The processing circuitry 820 may comprise RF circuitry and baseband processing circuitry (not shown). In particular embodiments, some or all of the functionality described below as being provided by a mobile base station, a base station controller, a relay node, a NodeB, an enhanced NodeB (eNB), and/or any other type of mobile communications node may be provided by the processing circuitry 820 executing instructions stored on a computer-readable medium, such as the memory 830 shown in FIG. 3. Alternative embodiments of the network node 800 may include additional components responsible for providing additional functionality, including any of the functionality identified below and/or any functionality necessary to support the solution described below.

Although the solutions described herein may be implemented in any appropriate type of telecommunication system supporting any suitable communication standards and using any suitable components, particular embodiments of the described solutions may be implemented in an LTE network.

The terms user equipment, user terminal, and wireless device as used herein are intended to encompass any type of wireless user device which is able to communicate with another wireless device by transmitting and receiving wireless signals. Thus, these terms encompass, but are not limited to an LTE user equipment, a mobile terminal, a wireless device for machine-to-machine communication, an integrated or embedded wireless card, and an externally plugged in wireless card.

The term wireless access point is intended to encompass, but is not limited to a base station such as an eNB, a home base station such as a Home eNB, a relay node, or a repeater.

Figure 4:
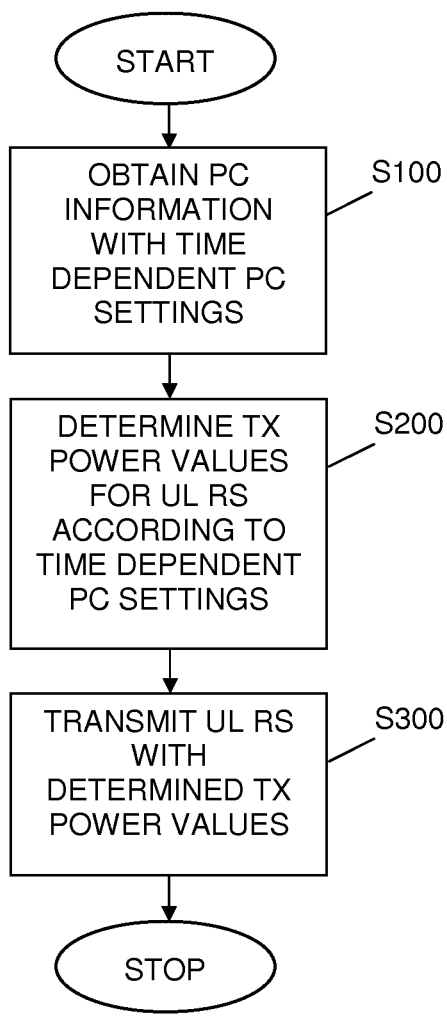
FIG. 4 is a flow chart showing an example of a method in a wireless device for transmitting uplink reference signals according to an embodiment.

FIG. 4 is a flow chart showing an embodiment of a method in a wireless device 900 of transmitting uplink reference signals from the wireless device 900 in a wireless communication network 100 to enable network-centric measurements. The method comprises a first step S100 of obtaining power control information defining a time-dependent power control setting for the uplink reference signals. The method further comprises a step S200 of determining transmit power values for the uplink reference signals according to the time-dependent power control setting, to provide uplink reference signals of different transmit power values at different time instants. The method also comprises a step S300 of transmitting the uplink reference signals with the determined transmit power values according to the time-dependent power control setting.

This approach is in clear contrast to the prior art, where the uplink reference signals are configured with the same settings for power control. In the document "SRS Enhancements for CoMP in Rel-11" from LG Electronics at the 3GPP TSG RAN WG1 Meeting #68 in Dresden, Germany, 6-10 Feb. 2012, they allow for different uplink power control but without any time-dependence in the power control settings.

As an example, the above described approach enables the network node to perform e.g. RSRP and/or RSRQ estimation/measurements and channel estimation, based on the uplink reference signals that are transmitted with the determined transmit power values according to the time-dependent power control setting.

In a particular embodiment, the power control information is at least partly received from the network side of the wireless communication network 100, and/or has at least partly default values, known by the wireless device 900 and the network side of the wireless communication network 100.

Figure 5:
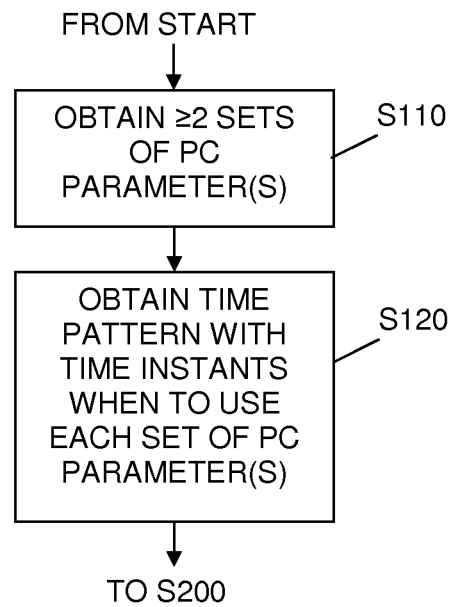
FIG. 5 is a flow chart showing a particular example of the obtaining step in FIG. 1 according to an embodiment.

FIG. 5 shows a particular embodiment of the step S100 of obtaining power control information defining a time-dependent power control setting for the uplink reference signals. In this embodiment the step S100 comprises a first step S110 of obtaining at least two different sets of power control parameter(s) for providing different transmit power values for the uplink reference signals, each set comprising at least one power control parameter, and a second step S120 of obtaining a time pattern defining time instants when to use the at least two different sets of power control parameter(s).

In a particular embodiment of the method of FIG. 5 a first of the at least two different sets of power control parameter(s) and a second of the at least two different sets of power control parameter(s) are used in respectively different subframes, as indicated by the time pattern.

In another particular embodiment of the method of FIG. 5 a first of the at least two different sets of power control parameter(s) is used as a default, and a second of the at least two different sets of power control parameter(s) is used in certain subframes as indicated by the time pattern.

In yet another particular embodiment of the method of FIG. 5 at least part of the uplink reference signals are so-called power-boosted uplink reference signals with a higher transmit power than the remaining uplink reference signals, and the obtained time pattern comprises information defining time instants for subframes in which those power-boosted uplink reference signals should be transmitted. In another particular embodiment, the time pattern comprises at least one time periodicity and/or time offset.

It should be noted that uplink reference signals are not necessarily transmitted at ALL time instances defined by the obtained time pattern. In some embodiments the time pattern only defines suitable time instants when uplink reference signals may be transmitted, but the actual signal transmission only occurs upon triggering.

In a particular embodiment of the method of FIG. 4, the power control information comprises at least one time-dependent power control parameter. In another particular embodiment the at least one time-dependent power control parameter is subframe-dependent. In yet another particular embodiment the at least one time-dependent power control parameter is a function of subframe index.

In another particular embodiment the power control information may comprise a transmit power level, or a power offset, or an indication of a downlink reference signal or set of downlink reference signals for which downlink measurements can be used as a basis for determining transmit power values for said uplink reference signals. The optional downlink measurements and corresponding estimation(s) can e.g. be performed using the circuits described in connection with FIG. 2.

In a particular embodiment the step S200 of determining transmit power values for the uplink reference signals includes a step of calculating transmit power values for the uplink reference signals based on pathloss measurements on the downlink reference signal or set of downlink reference signals indicated by the power control information.

Figure 6:
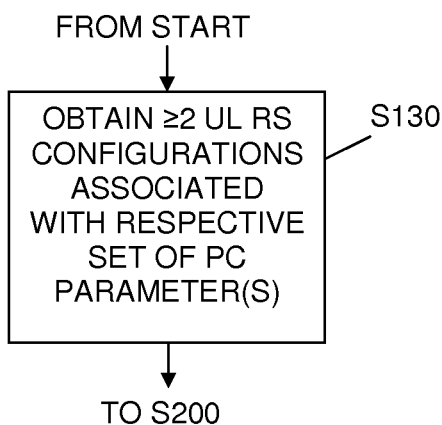
FIG. 6 is a flow chart showing a particular example of the obtaining step in FIG. 1 according to an embodiment.

FIG. 6 shows another particular embodiment of the step S100 of obtaining power control information defining a time-dependent power control setting for the uplink reference signals. In this embodiment the step S100 comprises a single step S130 of obtaining at least two different uplink reference signal configurations, each of which is respectively associated with its own set of power control parameter(s).

In a particular embodiment each uplink reference signal configuration is respectively associated with a different periodicity and/or time offset. In another particular embodiment an uplink reference signal configuration associated with a higher transmit power value is associated with a longer periodicity.

In yet another particular embodiment a precedence rule is used to decide which uplink reference signal to transmit in case uplink reference signal transmissions from different uplink reference signal configurations for the same wireless device are triggered to be transmitted in the same subframe. In a further particular embodiment, according to that precedence rule, only the uplink reference signal associated with an uplink reference signal configuration with a longer periodicity, or with a higher uplink reference signal power offset, or with a certain pre-defined priority index, is transmitted in case uplink reference signal transmissions from different uplink reference signal configurations for the same wireless device are triggered to be transmitted in the same subframe.

In a particular embodiment the at least uplink reference signal configurations are based on Type 0 and/or Type 1 reference signal configurations.

Figure 7:
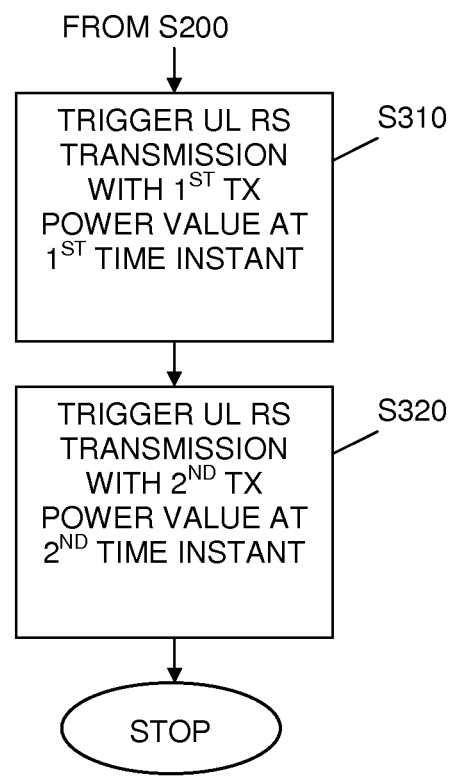
FIG. 7 is a flow chart showing a particular embodiment of the transmitting step in FIG. 1 according to an embodiment.

FIG. 7 shows a particular embodiment of the step S300 of transmitting the uplink reference signals with the determined transmit power values according to the time-dependent power control setting. In this embodiment the step S300 includes a first step S310 of triggering an uplink reference signal transmission with a first determined transmit power value a first time instant, and a second step S320 of triggering an uplink reference signal transmission with a second determined transmit power value at a second time instant, where the first transmit power value is different from the second transmit power value and the first time instant is different from the second time instant.

An alternative method of transmitting uplink reference signals from the wireless device 900 in a wireless communication network 100 to enable network-centric measurements according to an embodiment comprises a first step of obtaining at least two different uplink reference signal configurations, each associated with its own set of power control parameter(s), where the at least two uplink reference signal configurations are enabled simultaneously. The method further comprises a step of determining transmit power values for the uplink reference signals according to the at least two uplink reference signal configurations to provide uplink reference signals of different transmit power values. The method finally comprises a step of transmitting the uplink reference signals with the determined transmit power values to thereby provide uplink reference signals providing different coverage to reach different sets of network points at which network-centric measurements can be performed, where a precedence rule is used to decide which uplink reference signal to transmit in case uplink reference signal transmissions from different uplink reference signal configurations for the same wireless device are triggered to be transmitted in the same subframe.

Figure 8:
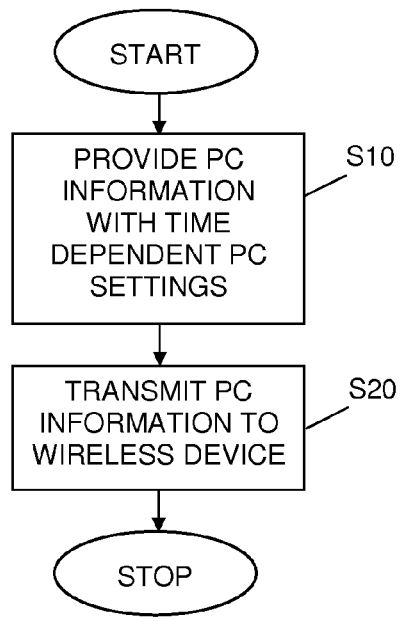
FIG. 8 is a flow chart showing an example of a method in a network node for supporting uplink reference signal configuration according to an embodiment.

FIG. 8 is a flow chart showing an embodiment of a method in a network node 800 for supporting uplink reference signal configuration of a wireless device 900 in a wireless communication network 100 to enable network-centric measurements. The method comprises a first step S10 of providing power control information defining a time-dependent power control setting for uplink reference signals. The method also comprises a second step S20 of transmitting the power control information defining a time-dependent power control setting to the wireless device to enable configuration of uplink reference signals with different transmit power values at different time instants, according to the time-dependent power control setting.

In an example embodiment the network node receives the uplink reference signals and can then perform e.g. RSRP and/or RSRQ estimation/measurements and channel estimation, based on the uplink reference signals that are configured with different transmit power values at different time instants according to the time-dependent power control setting.

In a particular embodiment the network node 800 is a wireless access point of the wireless communication network 100.

Figure 9:
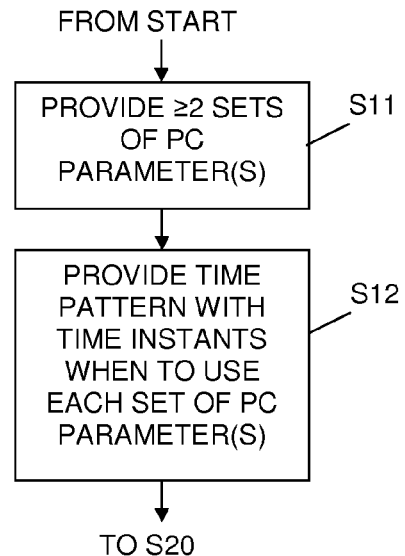
FIG. 9 is a flow chart showing a particular example of the providing step in FIG. 8 according to an embodiment.

FIG. 9 shows a particular embodiment of the step S10 of providing power control information. In this embodiment the step S10 comprises a first step S11 of providing at least two different sets of power control parameter(s) for providing different transmit power values for the uplink reference signals, each set comprising at least one power control parameter, and a second step S12 of providing a time pattern defining time instants when to use the at least two different sets of power control parameter(s).

In a particular embodiment of the method of FIG. 9 at least part of the uplink reference signals are so-called power-boosted uplink reference signals with a higher transmit power than the remaining uplink reference signals, and the provided time pattern comprises information defining time instants for subframes in which those power-boosted uplink reference signals should be transmitted. In another particular embodiment, the time pattern comprises at least one time periodicity and/or time offset.

In a particular embodiment of the method of FIG. 8 the power control information comprises at least one time-dependent power control parameter. In another particular embodiment the at least one time-dependent power control parameter is a function of subframe index.

Figure 10:
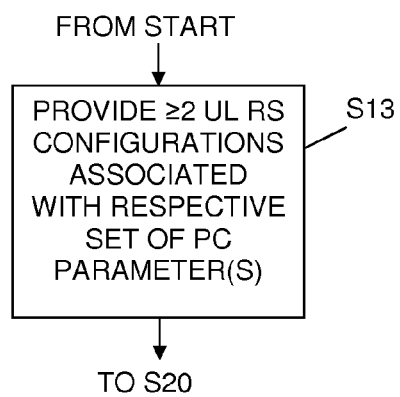
FIG. 10 is a flow chart showing a particular example of the providing step in FIG. 8 according to an embodiment.

FIG. 10 shows another particular embodiment of the step S10 of providing power control information. In this embodiment the step S10 comprises a single step S13 of providing at least two different uplink reference signal configurations, each of which is respectively associated with its own set of power control parameter(s). In a particular embodiment, each uplink reference signal configuration is respectively associated with a different periodicity and/or time offset. In another particular embodiment, an uplink reference signal configuration associated with a higher transmit power value is associated with a longer periodicity.

With reference again to FIG. 2, a block diagram of an embodiment of a wireless device 900 configured to transmit uplink reference signals in a wireless communication network 100 to enable network-centric measurements is shown. The wireless device 900 comprises processing circuitry 920 configured to obtain power control information defining a time-dependent power control setting for the uplink reference signals. The wireless device 900 further comprises processing circuitry 920 configured to determine transmit power values for the uplink reference signals according to the time-dependent power control setting, to provide uplink reference signals of different transmit power values at different time instants. The wireless device 900 also comprises radio circuitry 910 configured to transmit the uplink reference signals with the determined transmit power values according to the time-dependent power control setting.

In a particular embodiment the radio circuitry 910 is configured to receive at least part of the power control information from the network side of the wireless communication network 100 for transfer to the processing circuitry 920. In another particular embodiment, the processing circuitry 920 is configured to utilize default values for at least part of the power control information, where the default values are known by the wireless device 900 and the network side of the wireless communication network 100.

In another particular embodiment the processing circuitry 920 is configured to obtain the power control information comprising at least two different sets of power control parameter(s) for providing different transmit power values for the uplink reference signals, each set comprising at least one power control parameter, and a time pattern defining time instants when to use the at least two different sets of power control parameter(s). In a particular embodiment at least part of the uplink reference signals are so-called power-boosted uplink reference signals with a higher transmit power than the remaining uplink reference signals, and the obtained time pattern comprises information defining time instants for subframes in which those power-boosted uplink reference signals should be transmitted. In another particular embodiment, the time pattern comprises at least one time periodicity and/or time offset.

In a particular embodiment the processing circuitry 920 is configured to obtain the power control information comprising at least one time-dependent power control parameter. In another particular embodiment the at least one time-dependent power control parameter is a function of subframe index.

In another particular embodiment the processing circuitry 920 is configured to obtain the power control information in the form of at least two different uplink reference signal configurations, each of which is respectively associated with its own set of power control parameter(s).

In a particular embodiment each uplink reference signal configuration is respectively associated with a different periodicity and/or time offset. In another particular embodiment an uplink reference signal configuration associated with a higher transmit power value is associated with a longer periodicity.

In yet another particular embodiment the processing circuitry 920 is configured to use a precedence rule to decide which uplink reference signal to transmit in case uplink reference signal transmissions from different uplink reference signal configurations for said wireless device 900 are triggered to be transmitted in the same subframe. In a further particular embodiment the processing circuitry 920 is configured use that precedence rule to select for transmission only the uplink reference signal associated with an uplink reference signal configuration with a longer periodicity, or with a higher uplink reference signal power offset, or with a certain pre-defined priority index, in case uplink reference signal transmissions from different uplink reference signal configurations for said wireless device 900 are triggered to be transmitted in the same subframe.

In a particular embodiment the processing circuitry 920 is configured to trigger an uplink reference signal transmission with a first determined transmit power value a first time instant, and trigger an uplink reference signal transmission with a second determined transmit power value at a second time instant, where the first transmit power value is different from the second transmit power value and the first time instant is different from the second time instant.

With reference again to FIG. 3, a block diagram of an embodiment of a network node 800 configured to support uplink reference signal configuration of a wireless device 900 in a wireless communication network 100 to enable network-centric measurements is shown. The network node 800 comprises processing circuitry 820 configured to provide power control information defining a time-dependent power control setting for uplink reference signals. The network node also comprises radio circuitry 810 configured to transmit that power control information defining a time-dependent power control setting to the wireless device 900 to enable configuration of uplink reference signals with different transmit power values at different time instants, according to the time-dependent power control setting.

In an example embodiment, the units 810-830 of the network node can be used for the network-centric measurements.

In a particular embodiment the network node 800 is a wireless access point of the wireless communication network 100.

In another particular embodiment the processing circuitry 820 is configured to provide the power control information comprising at least two different sets of power control parameter(s) for providing different transmit power values for the uplink reference signals, each set comprising at least one power control parameter, and a time pattern defining time instants when to use the at least two different sets of power control parameter(s). In a particular embodiment at least part of said uplink reference signals are so-called power-boosted uplink reference signals with a higher transmit power than the remaining uplink reference signals, and the time pattern comprises information defining time instants for subframes in which those power-boosted uplink reference signals should be transmitted. In another particular embodiment the time pattern comprises at least one time periodicity and/or time offset.

In a particular embodiment the processing circuitry 820 is configured to provide the power control information comprising at least one time-dependent power control parameter. In another particular embodiment the at least one time-dependent power control parameter is a function of subframe index.

In another particular embodiment the processing circuitry 820 is configured to provide the power control information in the form of at least two different uplink reference signal configurations, each of which is respectively associated with its own set of power control parameter(s). In a particular embodiment each uplink reference signal configuration is respectively associated with a different periodicity and/or time offset. In another particular embodiment an uplink reference signal configuration associated with a higher transmit power value is associated with a longer periodicity.

It will be appreciated that the methods and devices described above can be combined and re-arranged in a variety of ways, and that the methods can at least partly be performed by one or more suitably programmed or configured digital signal processors and other known electronic circuits, e.g. discrete logic gates interconnected to perform a specialized function, or application-specific integrated circuits.

Many aspects of the present technology are described in terms of sequences of actions that can be performed by, for example, elements of a programmable computer system.

The steps, functions, procedures and/or blocks described above may be implemented in hardware using any conventional technology, such as discrete circuit or integrated circuit technology, including both general-purpose electronic circuitry and application-specific circuitry.

Alternatively, at least some of the steps, functions, procedures and/or blocks described above may be implemented in software for execution by a suitable computer or processing device such as a microprocessor, Digital Signal Processor (DSP) and/or any suitable programmable logic device such as a Field Programmable Gate Array (FPGA) device and a Programmable Logic Controller (PLC) device.

It should also be understood that it may be possible to re-use the general processing capabilities of any device or unit in which the present technology is implemented, such as a base station and/or UE. It may also be possible to re-use existing software, e.g. by re-programming of the existing software or by adding new software components.

Figure 11:
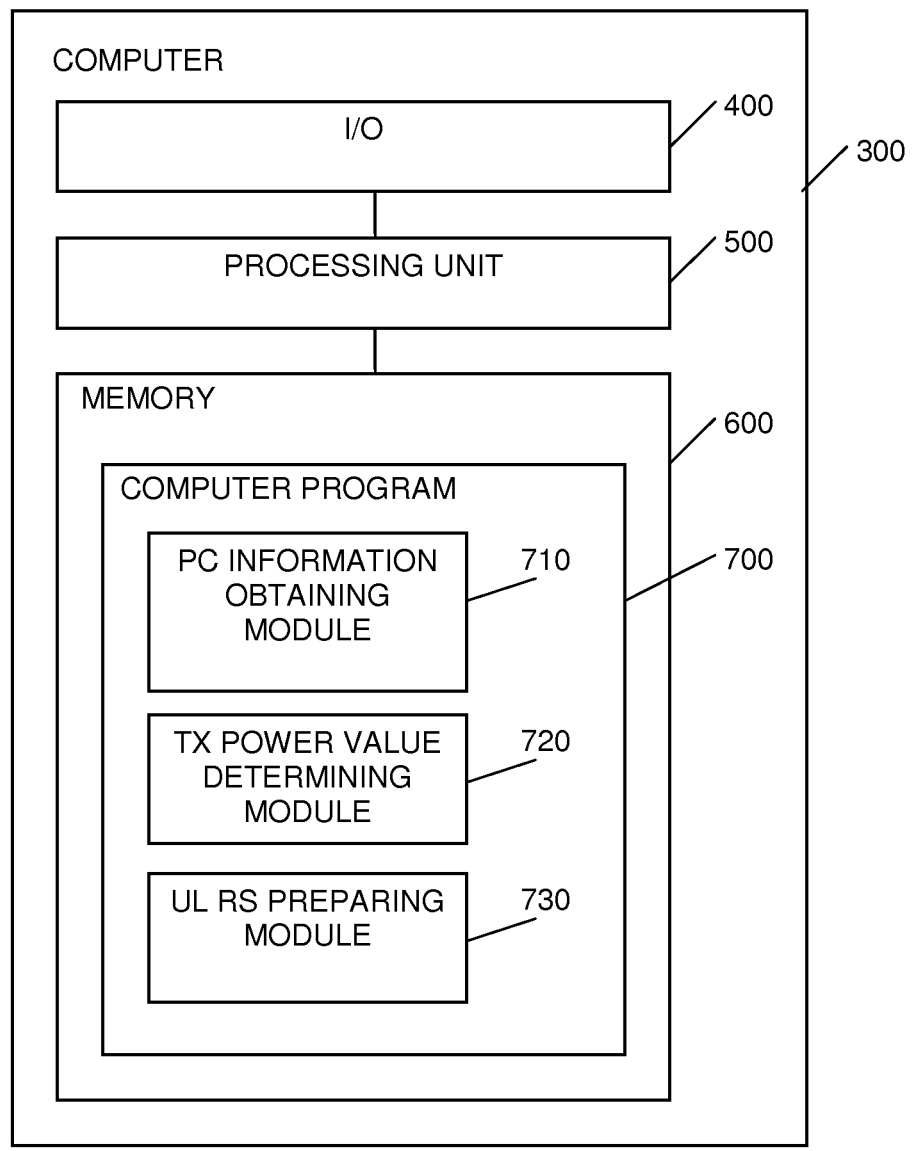
FIG. 11 is a block diagram of an example of a computer implementation according to an embodiment.

FIG. 11 is a schematic block diagram illustrating an example of a computer-implementation for preparing uplink reference signals from a wireless device 900 in a wireless communication network 100 to enable network-centric measurements. The computer 300 comprises a general input/output (I/O) unit 400 in order to enable communication with radio base stations in the communication network 100, and a processing unit 500, such as a DSP (Digital Signal Processor) or CPU (Central Processing Unit). The processing unit 500 can be a single unit or a plurality of units for performing different steps of the methods described herein. The computer 300 also comprises at least one memory 600, for instance an EEPROM (Electrically Erasable Programmable Read-Only Memory), a flash memory or a disk drive. The memory 600 in an embodiment comprises computer readable program means and a computer program 700, stored on the computer readable program means, for preparing, when executed by a computer 300, uplink reference signals from a wireless device 900 in a wireless communication network 100 to enable network-centric measurements.

The computer program 700 comprises program means 710-730 which when run by a processing unit 500, causes the processing unit 500 to perform the steps of the method described in the foregoing in connection with FIG. 4. Hence, in an embodiment the computer program 700 comprises program means 710 configured to obtain power control information defining a time-dependent power control setting for said uplink reference signals. The computer program 700 further comprises program means 720 configured to determine transmit power values for the uplink reference signals according to the time-dependent power control setting, to provide uplink reference signals of different transmit power values at different time instants. The computer program 700 also comprises program means 730 configured to prepare said uplink reference signals for transmission with the determined transmit power values according to the time-dependent power control setting.

The computer program 700 may additionally comprise further modules performing steps as disclosed in connection with FIGS. 5-10.

Moreover, the present technology can additionally be considered to be embodied within any form of computer-readable storage medium having stored therein an appropriate set of instructions for use by or in connection with an instruction-executed system, apparatus, or device, such as a computer-based system, processor-containing system, or other system that can fetch instructions from a medium and execute the instructions.

In the following, a number of non-limiting examples of illustrative embodiments are described.

In some embodiments, a wireless access point (such as an eNB) provides a wireless device, e.g. UE with power control parameters for an uplink RS configuration. The uplink RS configuration may e.g. be an SRS configuration. The power control parameters comprise an indication of a reference signal, or set of reference signals, on which the wireless device should base the transmit power for the uplink RS. The power control parameters may also indicate additional parameters, such as a pathloss compensation factor $\alpha_c(j)$ or a nominal transmit Power $P_{O\_PUSCH,c}(j)$ (see Eq. 1 in the appendix), which are to be applied in the transmit power calculation. The wireless device calculates the uplink transmit power based on a measurement (or set of measurements) performed on the indicated RS or set of RS, e.g. a pathloss measurement. As a particular example, Eq. 1 may be applied. The wireless device then transmits the uplink RS using the calculated transmit power. Depending on the point(s) that needs to be reached by SRS, a suitable SRS configuration may be employed for SRS transmission. If the reference transmission point for the reference signals employed for path loss calculation in the power control formula is properly configured, the SRS transmitted with the corresponding configuration is power controlled in order to reach the corresponding point. If SRS associated to different SRS configurations are transmitted at different time instants, it is possible to enable network centric measurements at different points with configurable time periodicities.

Figure 12A:
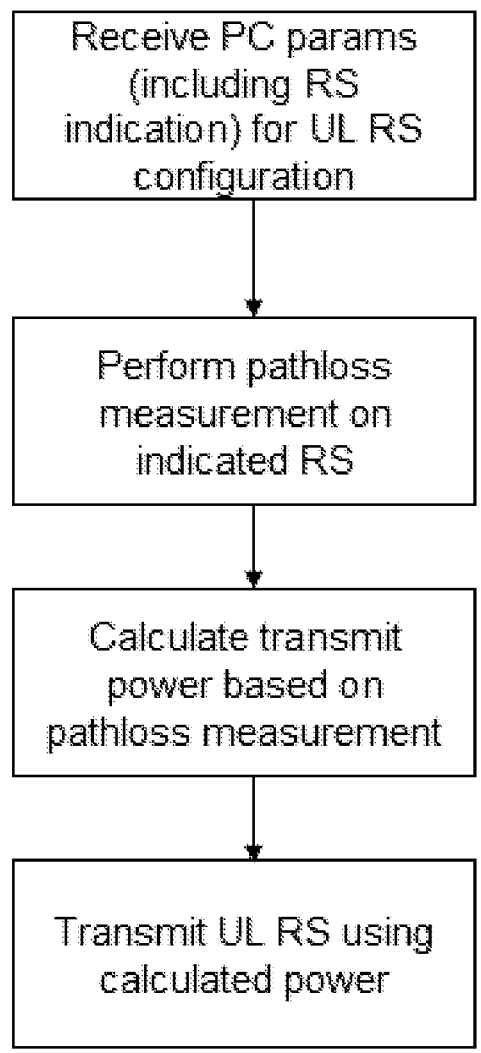
FIG. 12a is a flow chart showing an example of a method performed in a wireless device according to an embodiment.
Figure 12B:
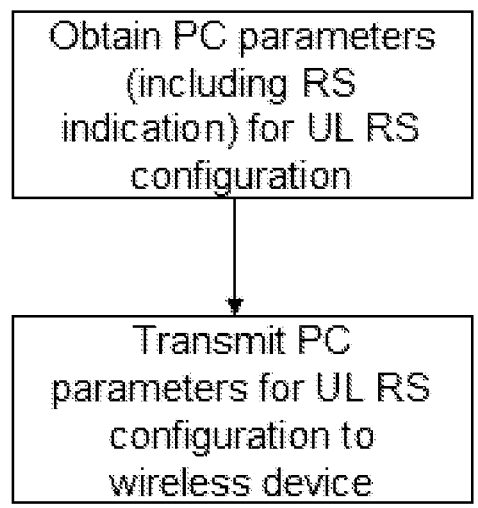
FIG. 12b is a flow chart showing an example of a corresponding method performed in a wireless access point according to an embodiment.

FIG. 12a illustrates a method performed in a wireless device, and FIG. 12b illustrates a corresponding method in a wireless access point. In FIG. 12b, the step of obtaining PC parameters may comprise determining one or more RS on which the wireless device should perform measurements for power control.

In one particular embodiment, the wireless device is provided with at least two uplink RS configurations, e.g. SRS configurations, each of which is associated with its own set of power control (PC) parameters. In particular, each uplink RS configuration may be associated with a separate RS or set of RS to measure on. As a concrete example, assume a UE located in a heterogeneous network, within one pico base station and one macro base station which are both potential CoMP downlink transmission points. The UE is provided with two SRS configurations, A and B. The PC parameters for configuration A indicate CSI-RS from the pico, whereas the PC parameters for configuration B indicate CSI-RS (or other RS) from the macro. The UE calculates the uplink transmit power based on pathloss measurements on the indicated RS, e.g. using an open loop formula similar to Eq. 1 in the appendix (where the pathloss measurements on the indicated RS would correspond to the PL term). This most likely results in different power settings for configurations A and B. By properly configuring the RS for PC, it is thus possible to adjust the coverage of different SRS configurations for CoMP selection or link adaptation. Additionally, the different uplink RS configurations may have different periodicities.

In another aspect, at least some of the problems outlined above may be addressed by transmitting uplink reference signals with increased power in only a subset of the subframes where uplink RS are transmitted. Stated differently, a wireless device, e.g. a user equipment, may be configured to transmit uplink reference signals with at least one power control parameter that is time-dependent, or, in a particular example, subframe-dependent. Generally, in the embodiments described below, the power control parameter may comprise a transmit power level, a power offset, or one or more parameters that the wireless device may use as a basis for determining the RS transmit power, e.g. one or more of the parameters of Eq. 1. In a specific example, the at least one PC parameter comprise an indication of an RS or set of RS on which to base the uplink transmit power, e.g. an indication of RS on which to perform pathloss measurements. Thus, this aspect may be combined with the aspect described above in connection with FIGS. 12a and 12b.

Figure 13:
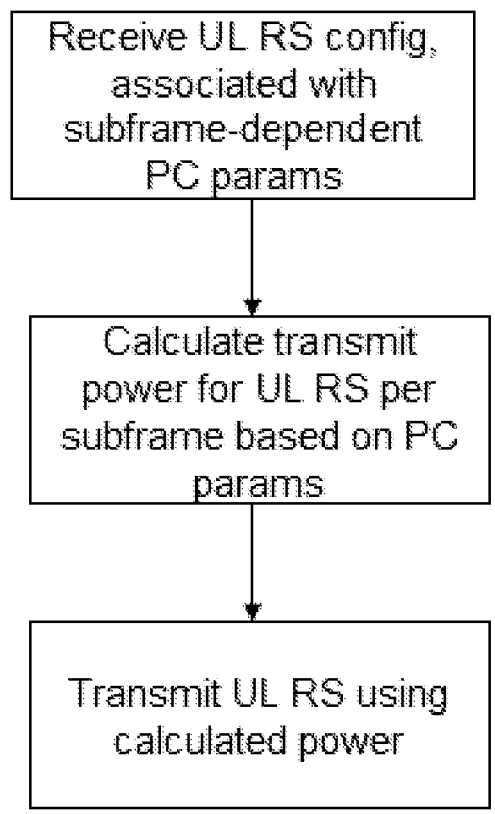
FIG. 13 is a flow chart showing an example of a method performed in a wireless access point according to an embodiment.

Some embodiments provide a method in a wireless access point, e.g. a base station such as an eNodeB. The wireless access point configures a wireless device with at least one time-dependent power control parameter for transmitting uplink reference signals (RS), e.g. SRS. In one example, the power control parameter is subframe-dependent. In a particular example, the wireless access point may configure the wireless device to transmit uplink RS such that at least one power control parameter is a function of the subframe index. The power control parameter and the function may have default values known to the network and the wireless device. Alternatively, either or both may be signaled from the wireless access point to the wireless device. A corresponding method in a wireless device is shown in FIG. 13.

In one variant, the wireless access point configures the wireless device with at least two separate RS configurations, each associated with a different periodicity and power control parameters. In a particular example, configurations associated with a higher transmit power level have a longer periodicity. As mentioned above, the periodicities and power control parameters may have preconfigured values, or some or all of their values may be signaled to the wireless device.

The at least two separate RS configurations are enabled simultaneously, in contrast to prior art where only one periodic SRS configuration may be enabled at any one time for a UE. In case SRS transmissions from different configurations for the same UE are triggered in the same subframe, a precedence rule may be defined in order to decide which SRS type is transmitted. This is described in more detail below.

In another variant, the wireless access point provides the wireless device with one RS configuration, which is associated with a first and a second power control parameter (or first and second sets of power control parameters). The wireless access point may provide a further indication of in which subframes to use the first and second parameters, respectively. The indication may e.g. be provided as two separate periodicities. Alternatively, the first power control parameter (or set of parameters) is used as a default, and the wireless access point indicates, e.g. in the form of a bitmap, certain subframes in which to apply the second power control parameter.

In some variants, the power control parameter comprises an explicitly indicated power level, e.g. a power offset. The specific power offset to use depends on the deployment and the position of the wireless device, and also on the difference between the max UE power and the nominal uplink RS power. However, one particular example will be given here to illustrate how to assign the power offset for the higher-power RS. This example assumes that the RS are SRS. Assume e.g. a hetnet where a UE is power controlled to the pico node, but the network intends to operate DL CoMP. Assume that no range expansion is present and that the UE lies close to the DL cell edge between the pico and macro. Assume also that the pico power is 30 dBm and macro power is 46 dBm, operating on the same system bandwidth. In this scenario, assuming the same SNR target for SRS intended for link adaptation (which need to reach the pico) and SRS intended for point selection (that need to reach the macro), then the power of the "boosted" SRS should be 16 dB higher than that of SRS for link adaptation. Thus, a power offset of 16 dB may be assigned.

In several embodiments described below, sounding reference signals are used as an example of uplink reference signals. However, it should be appreciated that the concepts presented here apply equally well to other types of uplink reference signals.

Some embodiments comprise occasionally transmitting SRS with individual PC settings, while the other SRS transmissions occur with conventional PC settings. If the occasional SRS transmissions have larger transmit power than the other ones and are sufficiently sparse in time, improved received signal power estimation (e.g. for CoMP point selection) may be performed by the network, while the increase in interference and UE energy consumption may still be kept at acceptable levels.

It is observed here that, while DL/UL link adaptation require frequent SRS transmissions in order to track instantaneous channel variations, energy estimation for point selection may be performed with significantly larger periodicity. The reason is that point selection is mainly affected by path loss and shadowing, which are assumed to vary relatively slowly compared to, e.g., fast fading.

It is also observed that high power uplink transmissions do not affect interference and power consumption if they are performed sufficiently seldom.

Some embodiments proposed herein comprise transmitting occasional RS with higher nominal power than SRS. In particular embodiments, such high power RS may be configured for UEs which are not able to reach in the UL all points of interest for point selection and/or mobility, unless SRS power is increased.

In one example the new high power RS comprise power boosted SRS (B-SRS). Even though B-SRS may share the same reference signal structure as conventional SRS, they are provided with an individual power control formula, which will be referred to as B-PC in the following. An example, non-limiting power control formula for B-SRS is:

$$P_{B\text{-}SRS,c}(i) = \min\{P_{CMAX,c}(i), P_{B\text{-}SRS\_OFFSET,c}(m) + 10\log_{10}(M_{B\text{-}SRS,c}) + P_{O\text{-}PUSCH,c}(j) + \alpha_{c,B\text{-}SRS}(j) \cdot PL_{B\text{-}SRS} + f_c(i)\}$$

where $P_{B\text{-}SRS\_OFFSET,c}(m)$ is the level of power boosting for B-SRS. $P_{B\text{-}SRS\_OFFSET,c}(m)$ may, e.g., have a default value known by both the network and UE. The default value is overridden in case $P_{B\text{-}SRS\_OFFSET,c}(m)$ is signaled by the network by RRC signaling. Possibly, other SRS parameters such as $M_{B\text{-}SRS,c}$, $\alpha_{c,B\text{-}SRS}(j)$ and $PL_{c,B\text{-}SRS}$ may assume a specific value in case of B-SRS, or they may be common with conventional SRS.

One way of achieving transmission of SRS with different power levels and possibly different configurations and different periodicities is to define time-specific SRS configurations.

One example comprises defining the SRS PC parameters as a function of the subframe index. At each SRS transmission the PC settings defined for the corresponding subframe are applied. Possibly, other SRS parameters such as bandwidth, frequency position etc. are defined and applied in a subframe-specific fashion similarly to PC.

One possibility is to signal from the network to the UEs a pattern of boosted subframes (B-SF) in which an alternative PC formula is applied, compared to the other subframes where the conventional LTE SRS PC formula is employed. The alternative PC formula may be characterized by a different PC offset value and/or different path loss measurements, in order to allow SRS transmitted in B-SF to reach a different set of points as compared to SRS transmitted in conventional subframes.

The alternative PC formula may be applied to specific SRS types (e.g., to SRS Type 0 and/or SRS Type 1) as configured by the network or as defined a-priori in the standard.

Figure 14:
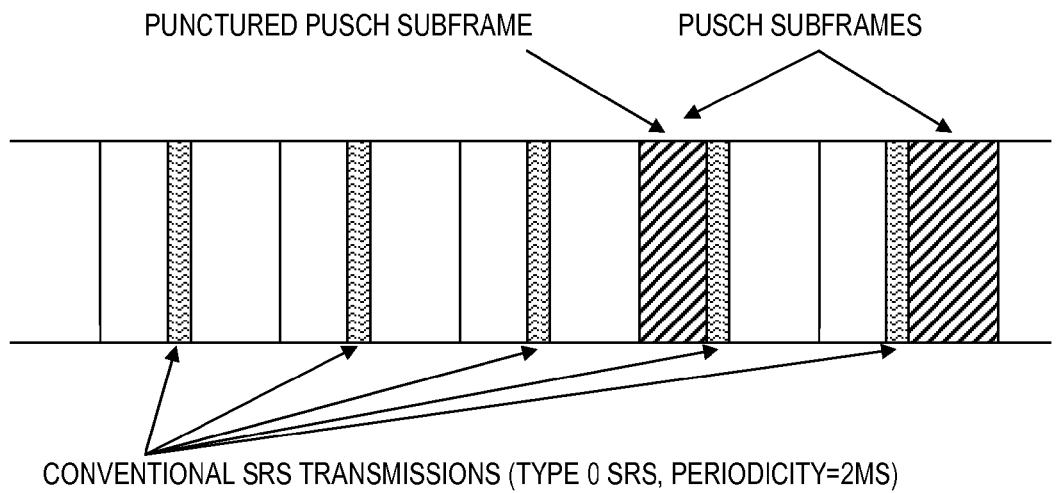
FIG. 14 is an example of UL subframes on a carrier according to prior art.
Figure 15:
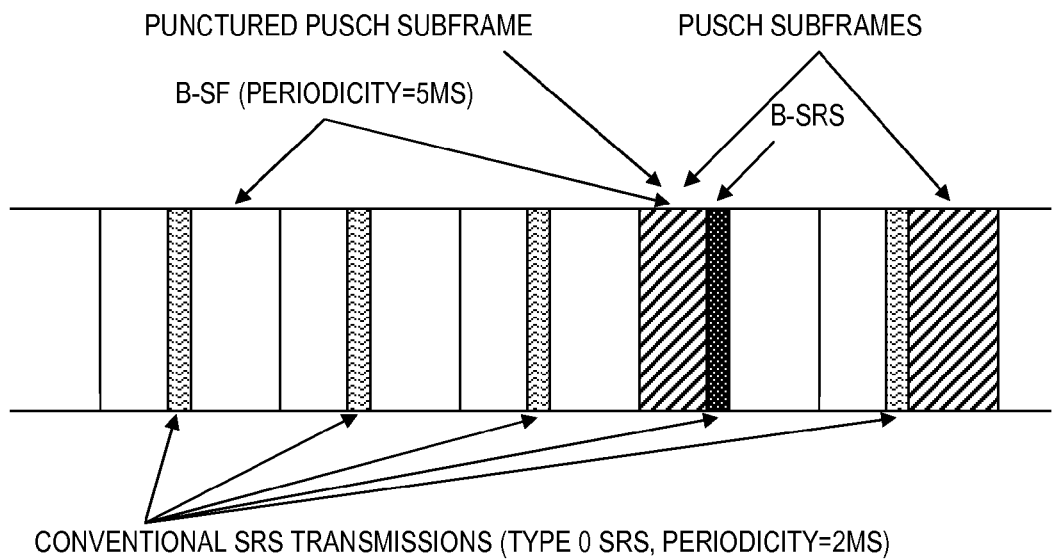
FIG. 15 is an example of UL subframes on a carrier according to an embodiment.
Figure 16:
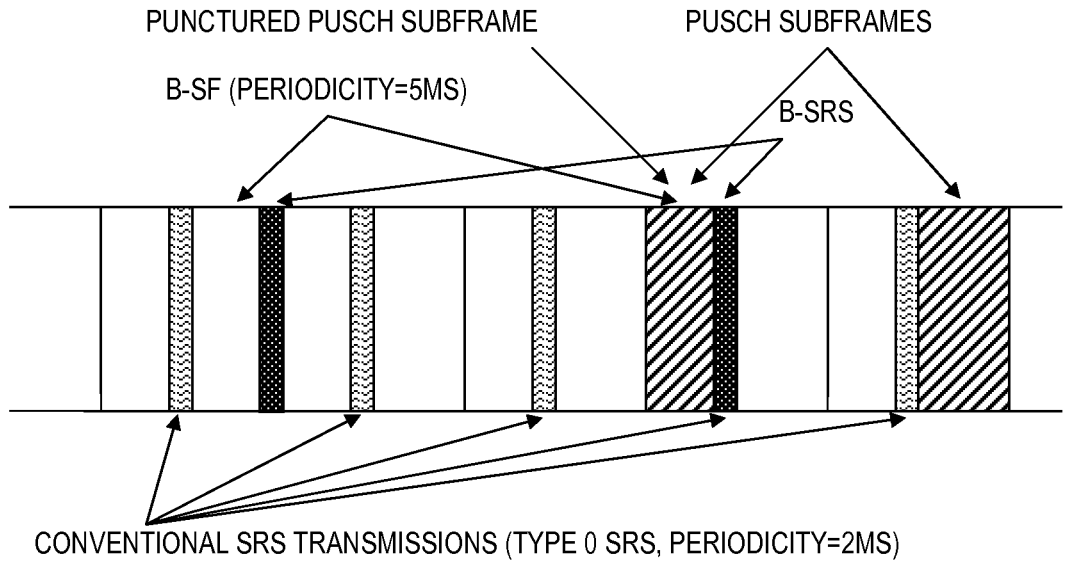
FIG. 16 is an example of UL subframes on a carrier according to an embodiment.

In one example, B-SF are defined by a time offset and periodicity, similarly to how SRS transmission occasions are specified in LTE (3GPP TS 36.211, v.10.2.0 and 3GPP TS 36.213, v.10.2.0). Whenever an SRS transmission occurs in a B-SF, the B-PC formula is employed, otherwise the normal PC formula is employed. The network configures the time instants for B-SF by RRC signaling for each UE. In B-SF normal SRS are not transmitted by a specific UE, while B-SRS are transmitted instead. Also, the last symbol of PUSCH transmission, if colliding with a B-SRS transmission, is punctured. See FIG. 14 for an example of UL subframes on a carrier according to prior art, FIG. 15 for an example of UL subframes on a carrier according to an embodiment, and FIG. 16 for another example of UL subframes on a carrier according to an embodiment.

The above procedure may be further clarified as follows:
1. The network configures UE-specific SRS transmission instants for Type 0 and/or Type 1 SRS.
2. The network configures UE-specific B-SF by defining their time offset and periodicity.
3. The UE transmits Type 0 and Type 1 SRS as configured by the network (Type 0) and/or scheduled by scheduling grants (Type 1). The conventional PC formula is employed.
4. If an SRS transmission instant occurs in a B-SF, a B-SRS is transmitted instead of the conventional SRS. The B-PC formula is exploited for PC of the B-SRS. Other SRS parameters (e.g., bandwidth, frequency position, etc) for conventional SRS are employed also for B-SRS.
5. The network performs energy and/or pathloss measurements at some reception points based on the received signal corresponding to B-SRS. Possibly, the relative difference in received energy for B-SRS at different points is computed. Possibly, energy estimates based on B-SRS are complemented with energy estimates performed at other time instants and based, e.g., on previous SRS and/or B-SRS transmissions.

In some examples, power boosting in B-SF by use of the B-PC formula is limited to certain SRS types, e.g., periodic (Type 0) SRS and/or aperiodic (Type 1) SRS.

A further example of how B-SRS may be defined is to allow each UE to enable and transmit more than one SRS configuration, where each configuration is characterized by at least some specific configuration parameters. Optionally, a different PC formula may be defined for different SRS configurations. Examples of SRS parameters that are unique to each configuration are a subset of SRS periodicity, SRS timing offset, SRS PC offset, reference signals set for path loss estimation for SRS PC, SRS bandwidth, SRS frequency position, reference signals for path loss estimation, nominal RS power, path loss compensation factor, etc. In one example, at least two different Type 0 SRS configurations are defined and transmitted, possibly with different periodicities, time offsets and power control settings.

In case SRS transmissions from different configurations for the same UE are triggered in the same subframe, a precedence rule may be defined in order to decide which SRS type is transmitted. Only one SRS instance (corresponding to a prioritized configuration) is transmitted, while the remaining SRS instances as well as last symbol of PUSCH transmission are punctured. In one example, for each SRS type (i.e., periodic and aperiodic) the SRS configuration with larger periodicity is prioritized. In another example, the SRS configuration with highest SRS power offset is prioritized. In a further example, a fixed priority based on a configuration index is defined (e.g., the first configuration is prioritized over the second configuration).

A further example of how to define B-SRS in LTE is the addition of individual power control parameters for some Type 1 SRS configurations. In LTE it is currently possible to dynamically select different SRS configurations, e.g., by triggering Type 1 SRS transmission with DCI format 4. However, all such configurations currently share a common PC formula. A way of implementing at least some embodiments in the standard would thus be to define a specific PC formula or at least some specific PC parameters for at least some SRS configurations.

In case a UE is configured to operate in UL on multiple carriers, the B-PC formula is defined in such a way that only SRS transmissions on one of the carriers are power boosted. This is motivated by the fact that long term channel properties such as path loss are approximately similar for different carriers, as long as the relative carrier spacing in frequency domain is limited compared to the carrier frequency.

Various embodiments disclosed herein enable improved precision in network measurements for mobility and/or CoMP points selection without significantly increasing energy consumption and interference.

The embodiments as disclosed herein can be used to enable network-centric measurements in a wireless communication network, thus providing an improved mechanism for e.g. network-based estimation of received UE energy, such as pathloss estimation, or estimation of RSRP and/or RSRQ which can then be used for channel estimation. Such a mechanism is particularly beneficial e.g. for downlink transmission point selection and/or mobility and DL/UL link adaptation purposes.

The embodiments makes it possible to increase the estimation reliability and/or accuracy, while at the same time limiting the increase in interference and UE power consumption. By using a time-dependent, or time-controlled, power control setting, it is for example possible to transmit power boosted uplink reference signals at selected time instants, which leads to improved uplink reference signal coverage while keeping interference levels at a reasonable level.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

APPENDIX

There is a wide variety of different wireless communication networks. A few examples of modern networks include Global System for Mobile Communications (GSM), Wideband Code Division Multiple Access/High Speed Packet Access (WCDMA/HSPA), and Long Term Evolution (LTE), etc. For LTE, improved support for heterogeneous network operations is part of the ongoing specification of 3GPP LTE Rel-11 (see also the background section).

Orthogonal Frequency-Division Multiplexing (OFDM) technology is a key underlying component of LTE. As is well known to those skilled in the art, OFDM is a digital multi-carrier modulation scheme employing a large number of closely-spaced orthogonal sub-carriers. Each sub-carrier is separately modulated using conventional modulation techniques and channel coding schemes. In particular, 3GPP has specified Orthogonal Frequency Division Multiple Access (OFDMA) for the downlink transmissions from the base station to a mobile terminal, and single carrier frequency division multiple access (SC-FDMA) for uplink transmissions from a mobile terminal to a base station. Both multiple access schemes permit the available sub-carriers to be allocated among several users.

SC-FDMA technology employs specially formed OFDM signals, and is therefore often called "pre-coded OFDM" or Discrete-Fourier-Transform (DFT)-spread OFDM. Although similar in many respects to conventional OFDMA technology, SC-FDMA signals offer a reduced peak-to-average power ratio (PAPR) compared to OFDMA signals, thus allowing transmitter power amplifiers to be operated more efficiently. This in turn facilitates more efficient usage of a mobile terminal's limited battery resources. SC-FDMA is described more fully in Myung, et al., "Single Carrier FDMA for Uplink Wireless Transmission," IEEE Vehicular Technology Magazine, vol. 1, no. 3, Sep. 2006, pp. 30-38.

The basic LTE physical resource can be seen as a time-frequency grid. Each individual element of the resource grid is called a resource element, and corresponds to one sub-carrier during one OFDM symbol interval, on a given antenna port. One aspect of OFDM is that each symbol begins with a cyclic prefix, which is essentially a reproduction of the last portion of the symbol affixed to the beginning. This feature minimizes problems from multipath propagation, over a wide range of radio signal environments.

In the time domain, LTE downlink transmissions are organized into radio frames of ten milliseconds each, each radio frame consisting of ten equally-sized subframes of one millisecond duration. Scheduling assignments operate typically on a subframe basis. Each subframe is further divided into two slots, each of which is 0.5 milliseconds in duration.

LTE link resources are organized into "resource blocks," defined as time-frequency blocks with a duration of 0.5 milliseconds, corresponding to one slot, and encompassing a bandwidth of 180 kHz, corresponding to 12 contiguous sub-carriers with a spacing of 15 kHz. Resource blocks are numbered in the frequency domain, starting with 0 from one end of the system bandwidth. Two time-consecutive resource blocks represent a resource block pair, and correspond to the time interval upon which scheduling operates. Of course, the exact definition of a resource block may vary between LTE and similar systems, and the inventive methods and apparatus described herein are not limited to the numbers used herein.

In general, however, resource blocks may be dynamically assigned to mobile terminals, and may be assigned independently for the uplink and the downlink. Depending on a mobile terminal's data throughput needs, the system resources allocated to it may be increased by allocating resource blocks across several sub-frames, or across several frequency blocks, or both. Thus, the instantaneous bandwidth allocated to a mobile terminal in a scheduling process may be dynamically adapted to respond to changing conditions.

For scheduling of downlink data, the base station transmits control information in each subframe. This control information identifies the mobile terminals to which data is targeted and the resource blocks, in the current downlink subframe, that are carrying the data for each terminal. The first one, two, three, or four OFDM symbols in each subframe are used to carry this control signaling.

Transmissions in LTE are dynamically scheduled in each subframe, where the base station transmits downlink assignments/uplink grants to certain mobile terminals, e g user equipments (UEs), in 3GPP terminology, via the physical downlink control channel (PDCCH). The PDCCHs are transmitted in the control region of the OFDM signal, i.e., in the first OFDM symbol(s) of each subframe, and span all or almost all of the entire system bandwidth. A UE that has decoded a downlink assignment, carried by a PDCCH, knows which resource elements in the subframe that contain data aimed for that particular UE. Similarly, upon receiving an uplink grant, the UE knows which time-frequency resources it should transmit upon. In the LTE downlink, data is carried by the physical downlink shared channel (PDSCH) and in the uplink the corresponding channel for carrying data is referred to as the physical uplink shared channel (PUSCH).

The PDCCH control messages to UEs are demodulated using common reference signals (CRS), and hence they have a wide cell coverage to reach all UEs in the cell without having knowledge about their position. As mentioned above, the first one to four OFDM symbols, depending on the configuration, in a subframe are reserved for control information. Control messages could be categorized into those types of messages that need to be sent only to one UE (UE-specific control) and those that need to be sent to all UEs or some subset of UEs numbering more than one (common control) within the cell being covered by an eNodeB (eNB).

It shall be noted in this context that in future LTE releases, there will be new carrier types which may not have a PDCCH transmission or transmission of CRS and is therefore not backward compatible. Such a carrier type is introduced in Rel-11, and by using carrier aggregation this new carrier type is aggregated with a legacy (backward compatible) carrier type. In future releases of LTE it may also be possible to have stand-alone carrier types, which are not associated with a legacy carrier.

Figure 17:
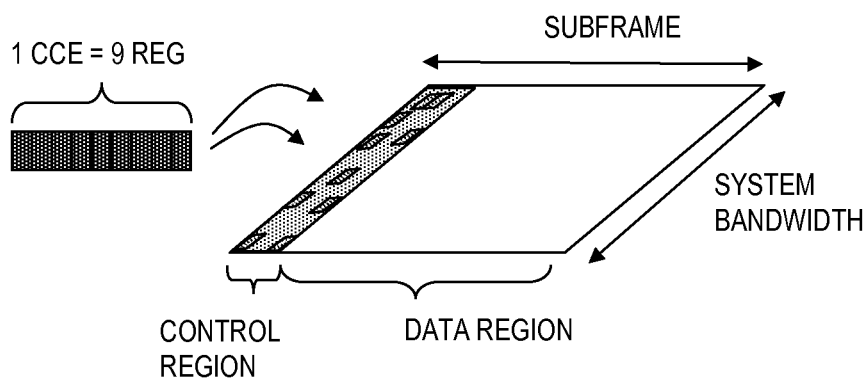
FIG. 17 shows a mapping of one CCE belonging to a PDCCH to the control region which spans the whole system bandwidth.

Control messages of PDCCH type are demodulated using common reference signals (CRS) and transmitted in multiples of units called control channel elements (CCEs) where each CCE contains 36 resource elements (REs). A PDCCH may have aggregation level of 1, 2, 4 or 8 CCEs to allow for link adaptation of the control message. Furthermore, each CCE is mapped to 9 resource element groups (REGs) consisting of 4 REs each. These REGs are distributed over the whole bandwidth to provide frequency diversity for a CCE. Hence, the PDCCH, which consists of up to 8 CCEs, spans the entire system bandwidth in the first one to four OFDM symbols, depending on the configuration. This is illustrated in FIG. 17.

Transmission of the physical downlink shared data channel (PDSCH) to UEs, is using the REs in a resource block (RB) pair that are not used for control messages or RS and can either be transmitted using the UE specific RS or the CRS as a demodulation reference, depending on the PDSCH transmission mode. The use of UE-specific RS allows a multi-antenna eNB to optimize the transmission using pre-coding of both data and reference signals being transmitted from the multiple antennas so that the received signal energy increase at the UE and consequently, the channel estimation performance is improved and the data rate of the transmission could be increased.

Figure 18:
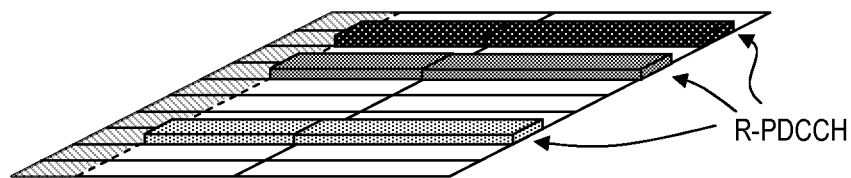
FIG. 18 shows a downlink subframe showing 10 RB pairs and transmission of 3 R-PDCCH of size 1 RB pair each.

In Rel-10 of LTE a relay control channel was also defined, denoted R-PDCCH for transmitting control information from eNB to relay nodes. The R-PDCCH is placed in the data region, hence, similar to a PDSCH transmission. The transmission of the R-PDCCH can either be configured to use CRS to provide wide cell coverage or relay node (RN) specific reference signals to improve the link performance towards a particular RN by pre-coding, similar to the PDSCH with UE-specific RS. The UE-specific RS is in the latter case used also for the R-PDCCH transmission. The R-PDCCH occupies a number of configured RB pairs in the system bandwidth and is thus frequency multiplexed with the PDSCH transmissions in the remaining RB pairs. FIG. 18 shows a downlink subframe with 10 RB pairs and transmission of 3 R-PDCCH of size 1 RB pair each. The R-PDCCH does not start at OFDM symbol zero to allow for a PDCCH to be transmitted in the first one to four symbols. The remaining RB pairs can be used for PDSCH transmissions.

In LTE Rel-11 discussions, attention has turned to adopt the same principle of UE-specific transmission as for the PDSCH and the R-PDCCH for enhanced control channels (including PDCCH, Physical channel Hybrid-ARQ Indicator Channel (PHICH), Physical Control Format Indicator Channel (PCFICH), Physical Broadcast Channel (PBCH)) by allowing the transmission of generic control messages to a UE using such transmissions be based on UE-specific reference signals. This is commonly known as the enhanced PDCCH (ePDCCH), enhanced PHICH (ePHICH) and so on. For the enhanced control channel in Rel-11 it has been agreed to use antenna port p$\in\{7,8,9,10\}$ for demodulation, i.e. the same antenna ports that are used for the PDSCH transmission using UE-specific RS. This enhancement means that pre-coding gains can be achieved also for the control channels. Another benefit is that different RB pairs (or enhanced control regions, see FIG. 21) can be allocated to different cells or different transmission points within a cell, and thereby can inter-cell or inter-point interference coordination between control channels be achieved. Similar to the PDCCH, eCCE can be defined which may differ from the CCE in the size and possibly also whether they are used for localized (spanning 1-2 adjacent RB only) or distributed transmission (spanning multiple RB over a wider bandwidth to achieve frequency diversity).

Figure 19:
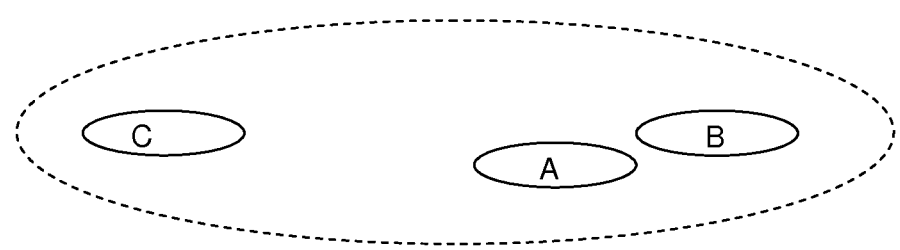
FIG. 19 shows a heterogeneous network scenario where the dashed line indicates the macro cell coverage area and A, B and C corresponds to the coverage of three pico nodes.
Figure 20:
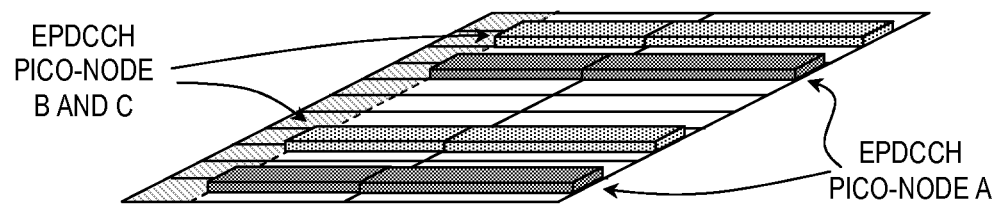
FIG. 20 shows an example of using different control regions for the pico nodes in FIG. 3.

Alternatively the same enhanced control region can be used in different transmission points within a cell or belonging to different cells that are not highly interfering with each other. A typical case is the shared cell scenario, where a macro-cell contains lower power pico-nodes within its coverage area, having (or being associated to) the same synchronization signal/cell ID. This is illustrated in FIG. 19, which shows a heterogeneous network scenario where the dashed line indicates the macro-cell coverage area and A, B and C correspond to the coverage of three pico-nodes. In a shared cell scenario A, B, C and the macro-cell have the same cell ID, e.g. the same synchronization signal (i.e. transmitted or being associated to the same synchronization signal). In pico-nodes which are geographically separated, as B and C in FIG. 19, the same enhanced control region, i.e. the same physical resource blocks (PRBs) used for the ePDCCH can be re-used. In this manner the total control channel capacity in the shared cell will increase since a given PRB resource is re-used, potentially multiple times, in different parts of the cell. This ensures that area splitting gains are obtained. An example is given in FIG. 20 where pico-node B and C share the enhanced control region whereas A, due to the proximity to B, is at risk of interfering with B and is therefore assigned an enhanced control region which is non-overlapping. Interference coordination between pico-nodes, or transmission points, within a shared cell is thereby achieved.

This area splitting and control channel frequency coordination is not possible with the PDCCH since the PDCCH spans the whole bandwidth.

Figure 21:
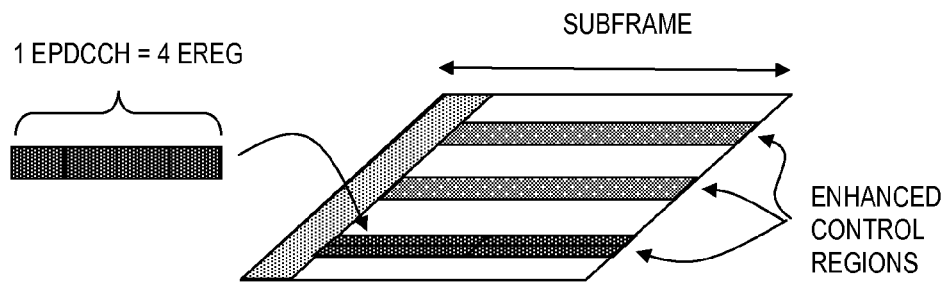
FIG. 21 shows an example of downlink subframe showing a CCE belonging to an ePDCCH mapped to one of the enhanced control regions, to achieve localized transmission.

FIG. 21 shows a downlink subframe with a CCE belonging to an ePDCCH which, similar to the CCE in the PDCCH, is divided into multiple groups and mapped to one of the enhanced control regions, to achieve localized transmission.

Note that in FIG. 21 the enhanced control region does not start at OFDM symbol zero, to accommodate simultaneous transmission of a PDCCH in the subframe. However, as was mentioned above, there may be carrier types in future LTE releases that do not have a PDCCH, in which case the enhanced control region could start from OFDM symbol zero within the subframe.

Even if the enhanced control channel enables UE-specific pre-coding and such localized transmission as illustrated in FIG. 21, it can in some cases be useful to be able to transmit an enhanced control channel in a broadcasted, wide area coverage fashion. This is useful if the eNB does not have reliable information to perform pre-coding towards a certain UE. Then a wide area coverage transmission is more robust, although the pre-coding gain is lost, or at least reduced, depending on the channel properties of the UEs involved in the reception and whether or not the eNB is able to take that into account. Another case is when the particular control message is intended for more than one UE. In this case, UE specific pre-coding cannot be used. An example is the transmission of the common control information using PDCCH (i.e. in the common search space). In yet another case, sub-band pre-coding may be utilized, since the UE estimates the channel in each RB pair individually, the eNB can choose different pre-coding vectors in the different RB pairs, if the eNB has such information that the preferred pre-coding vectors are different in different parts of the frequency band.

Figure 22:
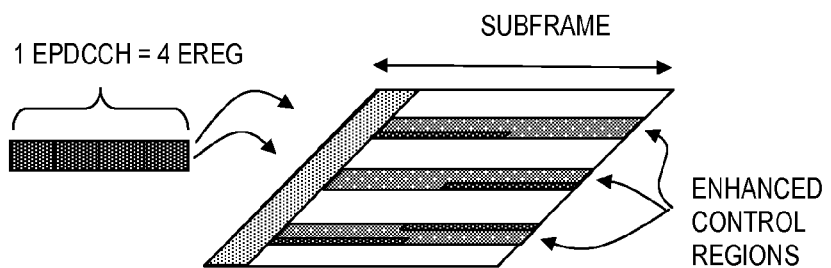
FIG. 22 shows an example of downlink subframe showing a CCE belonging to an ePDCCH mapped to a multiple of the enhanced control regions, to achieve distributed transmission and frequency diversity or sub-band pre-coding.

In any of these cases can a distributed transmission over enhanced control regions be used, as illustrated in FIG. 22, showing a downlink subframe with a CCE belonging to an ePDCCH which is mapped to multiple of the enhanced control regions, to achieve distributed transmission and frequency diversity or sub-band pre-coding. The eREG belonging to the same ePDCCH are distributed over the enhanced control regions.

LTE also employs multiple modulation formats, including at least QPSK (Quadrature Phase Shift Keying), 16-QAM (Quadrature Amplitude Modulation), and 64-QAM, as well as advanced coding techniques, so that data throughput may be optimized for any of a variety of signal conditions. Depending on the signal conditions and the desired data rate, a suitable combination of modulation format, coding scheme, and bandwidth is chosen, generally to maximize the system throughput. Power control is also employed to ensure acceptable bit error rates while minimizing interference between cells. In addition, LTE uses a hybrid-ARQ (HARQ) error correction protocol where, after receiving downlink data in a subframe, the terminal attempts to decode it and reports to the base station whether the decoding was successful (ACK) or not (NACK). In the event of an unsuccessful decoding attempt, the base station can retransmit the erroneous data.

Demodulation of transmitted data generally requires estimation of the radio channel. In LTE systems, this is done using transmitted reference signals (RS), i.e., transmitted symbols having values that are already known to the receiver. In LTE, cell-specific reference signals (CRS) are transmitted in all downlink subframes. In addition to assisting downlink channel estimation, the CRS are also used for mobility measurements performed by the UEs.

The CRS are generally intended for use by all the mobile terminals in the coverage area. To support improved channel estimation, especially when multiple-input multiple-output (MIMO) transmission techniques are used, LTE also supports UE-specific reference signals, as discussed above, which are targeted to individual mobile terminals and are intended specifically for channel estimation for demodulation purposes.

Since the CRS are common to all UEs in the cell, the transmission of CRS cannot be easily adapted to suit the needs of a particular UE. This is in contrast to UE-specific reference signals, by means of which each UE can have reference signals of its own placed in the data region only, as part of PDSCH.

The length of the control region that is used to carry PDCCH, e.g., one, two, or three symbols, can vary on a subframe-to-subframe basis, and is signaled to the UE in the Physical Control Format Indicator Channel (PCFICH). For very narrow system bandwidths, also four control symbols may be used. The PCFICH is transmitted within the control region, at locations known by terminals. Once a terminal has decoded the PCFICH, it then knows the size of the control region and in which OFDM symbol the data transmission starts.

Also transmitted in the control region is the Physical Hybrid-ARQ Indicator Channel. This channel carries ACK/NACK responses to a terminal, to inform the mobile terminal whether the uplink data transmission in a previous subframe was successfully decoded by the base station.

As noted above, CRS are not the only reference signals available in LTE. As of LTE Release 10 (Rel-10), a new reference signal concept was introduced. Separate UE-specific reference signals for demodulation of PDSCH are supported in Rel-10, as are reference signals specifically provided for measuring the channel for the purpose of generating channel state information (CSI) feedback from the UE. The latter reference signals are referred to as CSI-RS. CSI-RS are not transmitted in every subframe, and they are generally sparser in time and frequency than reference signals used for demodulation. CSI-RS transmissions may take place every fifth, tenth, twentieth, fortieth, or eightieth subframe, as determined by a periodicity parameter and a subframe offset, each of which are configured by Radio Resource Control (RRC) signaling.

A UE operating in connected mode can be requested by the base station to perform channel state information (CSI) reporting. This reporting can include, for example, reporting a suitable rank indicator (RI) and one or more pre-coding matrix indices (PMIs), given the observed channel conditions, as well as a channel quality indicator (CQI). Other types of CSI are also conceivable, including explicit channel feedback and interference covariance feedback. The CSI feedback assists the base station in scheduling, including deciding which subframe and resource blocks to use for the transmission, as well as deciding which transmission scheme and/or pre-coder should be used. The CSI feedback also provides information that can be used to determine a proper user bit-rate for the transmission, i.e., for link adaptation.

In LTE, both periodic and aperiodic CSI reporting are supported. In the case of periodic CSI reporting, the terminal reports the CSI measurements on a configured periodic time basis, using the physical uplink control channel (PUCCH). With aperiodic reporting, the CSI feedback is transmitted on the physical uplink shared channel (PUSCH) at pre-specified time instants after receiving the CSI grant from the base station. With aperiodic CSI reports, the base station can thus request CSI that reflects downlink radio conditions in a particular subframe.

While PUSCH carries data in the uplink, PUCCH is used for control feedback. PUCCH is a narrowband channel using a resource block pair where the two resource blocks are on opposite sides of the potential scheduling bandwidth to attain frequency diversity. PUCCH is used for conveying ACK/NACKs, periodic CSI feedback, and scheduling request to the network.

If the mobile terminal has not been assigned an uplink resource for data transmission, the L1/L2 control information (channel-status reports, hybrid-ARQ acknowledgments, and scheduling requests) is transmitted in uplink resources (resource blocks) specifically assigned for uplink L1/L2 control on Rel-8 Physical Uplink Control CHannel (PUCCH).

Figure 23:
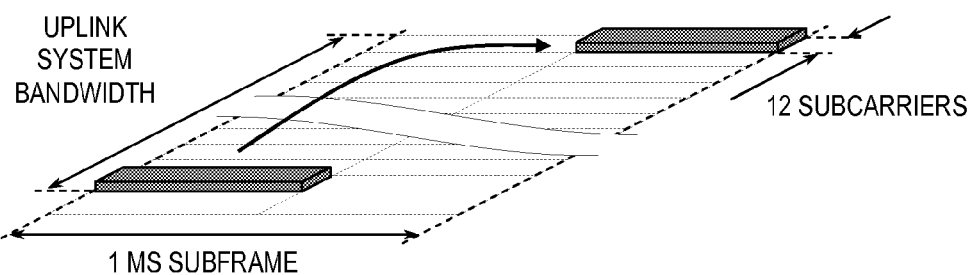
FIG. 23 shows an example of uplink L1/L2 control signaling transmission on Rel-8 PUCCH.

As illustrated in FIG. 23, these resources are located at the edges of the total available cell bandwidth. Each such resource consists of 12 "subcarriers" (one resource block) within each of the two slots of an uplink subframe. In order to provide frequency diversity, these frequency resources are frequency hopping on the slot boundary, i.e. one "resource" consists of 12 subcarriers at the upper part of the spectrum within the first slot of a subframe and an equally sized resource at the lower part of the spectrum during the second slot of the subframe or vice versa.

If more resources are needed for the uplink L1/L2 control signaling, e.g. in case of very large overall transmission bandwidth supporting a large number of users, additional resources blocks can be assigned next to the previously assigned resource blocks.

The reasons for locating the PUCCH resources at the edges of the overall available spectrum are two-fold:
  Together with the frequency hopping described above, this maximizes the frequency diversity experienced by the control signaling.
  Assigning uplink resources for the PUCCH at other positions within the spectrum, i.e. not at the edges, would have fragmented the uplink spectrum, making it impossible to assign very wide transmission bandwidths to single mobile terminal and still retain the single-carrier property of the uplink transmission.

The bandwidth of one resource block during one subframe is too large for the control signaling needs of a single terminal. Therefore, to efficiently exploit the resources set aside for control signaling, multiple terminals can share the same resource block. This is done by assigning the different terminals different orthogonal phase rotations of a cell-specific length-12 frequency-domain sequence and/or different orthogonal time-domain covers covering the subframes within a slot or subframe.

Uplink Sounding Reference Signals

Sounding reference signals (SRS) are transmitted on the uplink to allow for the base station to estimate the uplink channel state at different frequencies and time instants as compared to PUSCH transmissions. The channel-state estimates can then, for example, be used by the network scheduler to assign resource blocks of instantaneously good quality for uplink PUSCH transmission (uplink channel-dependent scheduling), as well as to select different transmission parameters such as the instantaneous data rate and different parameters related to uplink multi-antenna transmission. As mentioned earlier, SRS transmission can also be used for uplink timing estimation as well as to estimate downlink channel conditions assuming downlink/uplink channel reciprocity. Thus, an SRS is not necessarily transmitted together with any physical channel and if transmitted together with, for example, PUSCH, the SRS may cover a different, typically larger, frequency span. Possibly, SRS may also be employed for mobility measurements (e.g., cell and transmission/reception points association) as well as UL received signal strength measurements. Such measurements may be employed, e.g., for adjusting the power transmitted by the corresponding UE (power control, PC).

There are two types of SRS transmission defined for the LTE uplink: periodic SRS transmission, which has been available from the first release of LTE (Release 8); and aperiodic SRS transmission, introduced in LTE Release 10.

Periodic SRS Transmission

Periodic SRS transmission (also known as Type 0 SRS) from a terminal occurs at regular time intervals, from as often as once every 2 ms (every second subframe) to as infrequently as once every 160 ms (every 16th frame). When SRS is transmitted in a subframe, it occupies the last symbol of the subframe. As an alternative, in the case of TDD operation, SRS can also be transmitted within the Uplink Pilot Time Slot (UpPTS).

In the frequency domain, SRS transmissions should cover the frequency band that is of interest for the scheduler. This can be achieved in two ways:
1. By means of a sufficiently wideband SRS transmission that allows for sounding of the entire frequency band of interest with a single SRS transmission.
2. By means of more narrowband SRS transmission—that is, hopping in the frequency domain—in such a way that a sequence of SRS transmissions jointly covers the frequency band of interest.

The main benefit of wideband (non-hopping) SRS transmission is that the entire frequency band of interest can be sounded with a single SRS transmission—that is, within a single OFDM symbol. As described below, the entire OFDM symbol in which SRS is transmitted will be unavailable for data transmission in the cell. A single wideband SRS transmission is thus more efficient from a resource-utilization point of view as less OFDM symbols need to be used to sound a given overall bandwidth. However, in the case of a high uplink path loss, wideband SRS transmission may lead to relatively low received power density, which may degrade the channel-state estimation. In such a case it may be preferable to use a more narrowband SRS transmission, thereby focusing the available transmit power in a more narrow frequency range, and then hop over the total band to be sounded.

In general, different bandwidths of the SRS transmission can be available within a cell. A narrow SRS bandwidth, corresponding to four resource blocks, is always available in all cells, regardless of the uplink cell bandwidth. Up to three additional, more wideband SRS bandwidths may also be configured within the cell. The SRS bandwidths are then always a multiple of four resource blocks.

A terminal is then explicitly configured to use one of the SRS bandwidths available in the cell. If a terminal is transmitting SRS in a certain subframe, the SRS transmission may very well overlap, in the frequency domain, with PUSCH transmissions from other terminals within the cell. To avoid collision between SRS and PUSCH transmissions from different terminals, terminals should in general avoid PUSCH transmission in the OFDM symbols in which SRS transmission may occur. To achieve this, all terminals within a cell are aware of the set of subframes within which SRS may be transmitted by any terminal within the cell. All terminals should then avoid PUSCH transmission in the last OFDM symbol of those subframes.

On a more detailed level, the structure for sounding reference signals (SRS) is similar to that of uplink demodulation reference signals. More specifically, a sounding reference signal is also defined as a frequency-domain reference-signal sequence derived as a cyclic extension of prime-length Zadoff-Chu sequences. However, in the case of SRS, the reference-signal sequence is mapped to every second subcarrier, creating a "comb"-like spectrum. Taking into account that the bandwidth of the SRS transmission is always a multiple of four resource blocks, the lengths of the reference-signal sequences for SRS are thus always a multiple of 24. The reference-signal sequence to use for SRS transmission within the cell is taken from the same sequence group as the demodulation reference signals used for channel estimation for PUCCH. Similar to demodulation reference signals, different phase rotations (also, for SRS, typically referred to as "cyclic shifts") can be used to generate different SRS that are orthogonal to each other.

By assigning different phase rotations to different terminals, multiple SRS can thus be transmitted in parallel in the same subframe. However, it is then required that the reference signals span the same frequency band.

Another way to allow for SRS to be simultaneously transmitted from different terminals is to rely on the fact that each SRS only occupies every second subcarrier. Thus, SRS transmissions from two terminals can be frequency multiplexed by assigning them to different frequency shifts or "combs". In contrast to the multiplexing of SRS transmission by means of different "cyclic shifts", frequency multiplexing of SRS transmissions does not require the transmissions to cover identical frequency bands. To summarize, the following set of parameters defines the characteristics of an SRS transmission:

SRS transmission bandwidth—that is, the bandwidth covered by a single SRS transmission.
Hopping bandwidth—that is, the frequency band over which the SRS transmission is frequency hopping.
Frequency-domain position—that is, the starting point of the SRS transmission in the frequency domain.
Transmission comb.
Phase rotation (or equivalently cyclic shift) of the reference-signal sequence.

SRS transmission time-domain period (from 2 to 160 ms) and subframe offset.

A terminal that is to transmit SRS is configured with these parameters by means of higher layer (RRC) signaling. In addition, all terminals within a cell should be informed in what subframes SRS may be transmitted within the cell as, within these subframes, the "SRS symbol" should not be used for PUSCH transmission.

Aperiodic SRS Transmission

In contrast to periodic SRS, aperiodic SRS (also known as Type 1 SRS) are one-shot transmissions, triggered by signaling on PDCCH as part of the scheduling grant. The frequency-domain structure of an aperiodic SRS transmission is identical to that of periodic SRS. Also, in the same way as for periodic SRS transmission, aperiodic SRS are transmitted within the last symbol of a subframe. Furthermore, the time instants when aperiodic SRS may be transmitted are configured per terminal using higher-layer signaling.

The frequency-domain parameters for aperiodic SRS (bandwidth, odd or even "comb", etc.) are configured by higher-layer (RRC) signaling. However, no SRS transmission will actually be carried out until the terminal is explicitly triggered to do so by an explicit SRS trigger on PDCCH. When such a trigger is received, a single SRS is transmitted in the next available aperiodic SRS instant configured for the terminal using the configured frequency-domain parameters. Additional SRS transmissions can then be carried out if additional triggers are received. Three different parameter sets can be configured for aperiodic SRS, for example differing in the frequency position of the SRS transmission and/or the transmission comb. Information on what parameters to use when the SRS is actually transmitted is included in the PDCH information, which consists of two bits, three combinations of which indicate the specific SRS parameter set. The fourth combination simply indicates that no SRS should be transmitted.

UL Power Control for SRS

The setting of the UE transmit power $P_{SRS}$ for the Sounding Reference Symbol transmitted on subframe i for serving cell c is defined by $$P_{SRS,c}(i) = \min\{P_{CMAX,c}(i), P_{SRS\_OFFSET,c}(m) + 10 \log_{10}(M_{SRS,c}) + P_{O\_PUSCH,c}(j) + \alpha_c(j) \cdot PL_c + f_c(i)\} \text{[dBm]} \quad \text{(Eq. 1)}$$

where $P_{CMAX,c}(i)$ is the configured UE transmit power (defined in 3GPP TS 36.101 "Evolved Universal Terrestrial Radio Access (E-UTRA); User Equipment (UE) radio transmission and reception") in subframe i for serving cell c.

$P_{SRS\_OFFSET,c}(n)$ is a parameter semi-statically configured by higher layers for m=0 and m=1 for serving cell c. For SRS transmission given trigger type 0 then m=0 and for SRS transmission given trigger type 1 then m=1.

$M_{SRS,c}$ is the bandwidth of the SRS transmission in subframe i for serving cell c expressed in number of resource blocks.

$f_c(i)$ is the current PUSCH power control adjustment state for serving cell c, i.e., the closed loop (CL) PC correction for PUSCH. CL PC commands are included in Downlink Control Information (DCI) formats for scheduling. Additionally, DCI formats 3/3A include CL PC commands. See also 3GPP TS 36.213, v10.4.0, section 5.1.1.1.

The nominal Tx power $P_{O\_PUSCH,c}(j)$ and the pathloss compensation factor $\alpha_c(j)$ are parameters defined by higher layer signaling. These parameters are further explained in 3GPP TS 36.213, v10.4.0, section 5.1.1.1.

$PL_c$ is the downlink pathloss estimate calculated in the UE for serving cell c in dB. The pathloss estimate is calculated by the UE as the difference between the received power for a certain reference signal and its nominal Tx power, and it is possibly averaged in time.

If the total transmit power of the UE for the Sounding Reference Symbol would exceed $\hat{P}_{CMAX}(i)$, the UE scales $\hat{P}_{SRS,c}(i)$ for the serving cell c in subframe i such that the condition $$\sum_c w(i) \cdot \hat{P}_{SRS,c}(i) \leq \hat{P}_{CMAX}(i)$$

is satisfied where $\hat{P}_{SRS,c}(i)$ is the linear value of $P_{SRS,c}(i)$, $\hat{P}_{CMAX}(i)$ is the linear value of the maximum transmit power $P_{CMAX}$ in subframe i and w(i) is a scaling factor of $\hat{P}_{SRS,c}(i)$ for serving cell c where $0 < w(i) \leq 1$. Note that w(i) values are the same across serving cells.

UL Power Control for PUSCH and PUCCH

The power control (PC) procedure for PUSCH and PUCCH is formally similar to that for SRS. Even though some parameters may differ between the PC formulas for PUSCH, PUCCH and SRS, one fundamental aspect is that closed loop (CL) PC corrections are common to SRS and PUSCH, while an independent CL PC correction is applied to PUCCH. Furthermore, PUCCH PC commands are included in DCI formats scheduling DL transmission, while PUSCH/SRS PC commands are included in DCI formats scheduling UL transmissions.

It is further possible to CL PC either PUCCH or PUSCH/SRS by DCI formats 3/3B. Such DCI formats include PC commands for a subset of UEs.

The invention claimed is:

1. A method in a wireless device of transmitting uplink reference signals from said wireless device in a wireless communication network to enable network-centric measurements, said method comprising:

obtaining power control information defining a time-dependent power control setting for said uplink reference signals, wherein the obtaining of the power control information comprises obtaining at least two different uplink reference signal configurations, each of which is respectively associated with its own set of power control parameter(s), wherein a precedence rule is used to decide which uplink reference signal to transmit in case uplink reference signal transmissions from different uplink reference signal configurations for the same wireless device are triggered to be transmitted in the same subframe;

determining transmit power values for said uplink reference signals according to said time-dependent power control setting, to provide uplink reference signals of different transmit power values at different time instants; and transmitting said uplink reference signals with the determined transmit power values according to said time-dependent power control setting.

2. The method according to claim 1, wherein said power control information at least partly is received from the network side of said wireless communication network, and/or at least partly has default values, known by said wireless device and the network side of said wireless communication network.

3. The method according to claim 1, wherein said step of obtaining the power control information comprises:
  obtaining at least two different sets of power control parameter(s) for providing different transmit power values for said uplink reference signals, each set comprising at least one power control parameter; and
  obtaining a time pattern defining time instants when to use said at least two different sets of power control parameter(s).

4. The method according to claim 3, wherein at least part of said uplink reference signals are so-called power-boosted uplink reference signals with a higher transmit power than the remaining uplink reference signals, and said time pattern comprises information defining time instants for subframes in which said power-boosted uplink reference signals should be transmitted.

5. The method according to claim 3, wherein said time pattern comprises at least one time periodicity and/or time offset.

6. The method according to claim 1, wherein said power control information comprises at least one time-dependent power control parameter.

7. The method according to claim 6, wherein said at least one time-dependent power control parameter is a function of subframe index.

8. The method according to claim 1, wherein each uplink reference signal configuration is respectively associated with a different periodicity and/or time offset.

9. The method according to claim 8, wherein an uplink reference signal configuration associated with a higher transmit power value is associated with a longer periodicity.

10. The method according to claim 1, wherein, according to said precedence rule, only the uplink reference signal associated with an uplink reference signal configuration with a longer periodicity, or with a higher uplink reference signal power offset, or with a certain pre-defined priority index, is transmitted in case uplink reference signal transmissions from different uplink reference signal configurations for the same wireless device are triggered to be transmitted in the same subframe.

11. The method according to claim 1, wherein said step of transmitting said uplink reference signals with the determined transmit power values according to said time-dependent power control setting includes:
  triggering an uplink reference signal transmission with a first determined transmit power value a first time instant; and
  triggering an uplink reference signal transmission with a second determined transmit power value at a second time instant;
  wherein said first transmit power value is different from said second transmit power value and said first time instant is different from said second time instant.

12. The method according to claim 1, wherein obtaining the power control information comprises receiving said time-dependent power control setting from the network side of said wireless communication network.

13. A wireless device configured to transmit uplink reference signals in a wireless communication network, to enable network-centric measurements, said wireless device comprising:
  processing circuitry configured to obtain power control information defining a time-dependent power control setting for said uplink reference signals, wherein said power control information includes at least two different uplink reference signal configurations, each of which is respectively associated with its own set of power control parameter(s), wherein a precedence rule is used to decide which uplink reference signal to transmit in case uplink reference signal transmissions from different uplink reference signal configurations for the same wireless device are triggered to be transmitted in the same subframe;
  processing circuitry configured to determine transmit power values for said uplink reference signals according to said time-dependent power control setting, to provide uplink reference signals of different transmit power values at different time instants; and
  radio circuitry configured to transmit said uplink reference signals with the determined transmit power values according to said time-dependent power control setting.

14. The wireless device according to claim 13, wherein said radio circuitry is configured to receive at least part of said power control information from the network side of said wireless communication network for transfer to said processing circuitry.

15. The wireless device according to claim 13, wherein said processing circuitry is configured to utilize default values for at least part of said power control information, where said default values are known by said wireless device and the network side of said wireless communication network.

16. The wireless device according to claim 13, wherein the power control information comprises:
  at least two different sets of power control parameter(s) for providing different transmit power values for said uplink reference signals, each set comprising at least one power control parameter; and
  a time pattern defining time instants at which to use said at least two different sets of power control parameter(s).

17. The wireless device according to claim 16, wherein at least part of said uplink reference signals are so-called power-boosted uplink reference signals with a higher transmit power than the remaining uplink reference signals, and said time pattern comprises information defining time instants for subframes in which said power-boosted uplink reference signals should be transmitted.

18. The wireless device according to claim 16, wherein said time pattern comprises at least one time periodicity and/or time offset.

19. The wireless device according to claim 13, wherein said power control information comprises at least one time-dependent power control parameter.

20. The wireless device according to claim 19, wherein said at least one time-dependent power control parameter is a function of subframe index.

21. The wireless device according to claim 13, wherein each uplink reference signal configuration is respectively associated with a different periodicity and/or time offset.

22. The wireless device according to claim 21, wherein an uplink reference signal configuration associated with a higher transmit power value is associated with a longer periodicity.

23. The wireless device according to claim 13, wherein the processing circuitry that is configured to determine the transmit power values for said uplink reference signals is configured use said precedence rule to select for transmission only the uplink reference signal associated with an uplink reference signal configuration with a longer periodicity, or with a higher uplink reference signal power offset, or with a certain pre-defined priority index, in case uplink reference signal transmissions from different uplink reference signal configurations for said wireless device are triggered to be transmitted in the same subframe.

24. The wireless device according to claim 13, wherein the processing circuitry that is configured to determine the transmit power values for said uplink reference signals is configured to:
trigger an uplink reference signal transmission with a first determined transmit power value a first time instant; and
trigger an uplink reference signal transmission with a second determined transmit power value at a second time instant;
wherein said first transmit power value is different from said second transmit power value and said first time instant is different from said second time instant.

25. A non-transitory computer readable medium that comprises a computer program for configuring uplink reference signals from a wireless device in a wireless communication network, to enable network-centric measurements, said computer program comprising program instructions that, when executed by a processor of the wireless device, cause the wireless device to:
obtain power control information defining a time-dependent power control setting for said uplink reference signals, wherein the obtaining of the power control information comprises obtaining at least two different uplink reference signal configurations, each of which is respectively associated with its own set of power control parameter(s), wherein a precedence rule is used to decide which uplink reference signal to transmit in case uplink reference signal transmissions from different uplink reference signal configurations for the same wireless device are triggered to be transmitted in the same subframe;
determine transmit power values for said uplink reference signals according to said time-dependent power control setting, to provide uplink reference signals of different transmit power values at different time instants; and
configure said uplink reference signals for transmission with the determined transmit power values according to said time-dependent power control setting.

26. The non-transitory computer readable medium according to claim 25, wherein said power control information at least partly is received from the network side of said wireless communication network, and/or at least partly has default values, known by said wireless device and the network side of said wireless communication network.

27. The non-transitory computer readable medium according to claim 25, said computer program comprising program instructions that, when executed by a processor of the wireless device, cause the wireless device to:
obtain at least two different sets of power control parameter(s) for providing different transmit power values for said uplink reference signals, each set comprising at least one power control parameter; and
obtain a time pattern defining time instants when to use said at least two different sets of power control parameter(s).

28. The non-transitory computer readable medium according to claim 27, wherein at least part of said uplink reference signals are so-called power-boosted uplink reference signals with a higher transmit power than the remaining uplink reference signals, and said time pattern comprises information defining time instants for subframes in which said power-boosted uplink reference signals should be transmitted.

29. The non-transitory computer readable medium according to claim 27, wherein said time pattern comprises at least one time periodicity and/or time offset.

30. The non-transitory computer readable medium according to claim 25, wherein said power control information comprises at least one time-dependent power control parameter.

31. The non-transitory computer readable medium according to claim 30, wherein said at least one time-dependent power control parameter is a function of subframe index.

32. The non-transitory computer readable medium according to claim 25, wherein each uplink reference signal configuration is respectively associated with a different periodicity and/or time offset.

33. The non-transitory computer readable medium according to claim 25, wherein an uplink reference signal configuration associated with a higher transmit power value is associated with a longer periodicity.

34. The non-transitory computer readable medium according to claim 25, wherein, according to said precedence rule, only the uplink reference signal associated with an uplink reference signal configuration with a longer periodicity, or with a higher uplink reference signal power offset, or with a certain pre-defined priority index, is transmitted in case uplink reference signal transmissions from different uplink reference signal configurations for the same wireless device are triggered to be transmitted in the same subframe.

35. The non-transitory computer readable medium according to claim 25, said computer program comprising program instructions that, when executed by a processor of the wireless device, cause the wireless device to:
transmit said uplink reference signals with the determined transmit power values according to said time-dependent power control setting includes:
trigger an uplink reference signal transmission with a first determined transmit power value a first time instant; and
trigger an uplink reference signal transmission with a second determined transmit power value at a second time instant;
wherein said first transmit power value is different from said second transmit power value and said first time instant is different from said second time instant.

36. The non-transitory computer readable medium according to claim 25, wherein obtaining the power control information comprises receiving said time-dependent power control setting from the network side of said wireless communication network.

* * * * *